US008358278B2

(12) United States Patent
Lim et al.

(10) Patent No.: US 8,358,278 B2
(45) Date of Patent: Jan. 22, 2013

(54) INPUT DEVICE, MOBILE TERMINAL HAVING THE SAME, AND USER INTERFACE THEREOF

(75) Inventors: Seung-Geun Lim, Seoul (KR); Young-Hwan Sung, Gyeonggi-Do (KR); Byung-Jin Ahn, Seoul (KR); Won-Seok Joo, Seoul (KR); Chang-Jea Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 912 days.

(21) Appl. No.: 12/098,872

(22) Filed: Apr. 7, 2008

(65) Prior Publication Data
US 2008/0309637 A1 Dec. 18, 2008

(30) Foreign Application Priority Data

Jun. 12, 2007 (KR) .................. 10-2007-0057415
Jun. 25, 2007 (KR) .................. 10-2007-0062428

(51) Int. Cl.
*G06F 3/041* (2006.01)
(52) U.S. Cl. ......... 345/173; 345/156; 345/184; 715/830
(58) Field of Classification Search ........... 345/156–179
See application file for complete search history.

(56) References Cited

U.S. PATENT DOCUMENTS

| 7,068,259 | B2 | 6/2006 | Kim et al. |
| 7,120,473 | B1 | 10/2006 | Hawkins et al. |
| 7,170,497 | B2 * | 1/2007 | Husgafvel et al. ............ 345/172 |
| 7,190,349 | B2 | 3/2007 | Kim et al. |
| 2007/0296704 | A1 * | 12/2007 | Park et al. ..................... 345/169 |

FOREIGN PATENT DOCUMENTS

| DE | 19743283 C1 | 2/1999 |
| TW | 527478 B | 4/2003 |
| TW | I275984 B | 3/2007 |
| TW | I276989 B | 3/2007 |

* cited by examiner

*Primary Examiner* — Kevin M Nguyen
*Assistant Examiner* — Kenneth B Lee, Jr.
(74) *Attorney, Agent, or Firm* — Birch, Stewart, Kolasch & Birch, LLP

(57) ABSTRACT

An input device includes a scroll unit installed on a case and configured to select a menu, a manipulation unit configured to operate a menu selected by the scroll unit and having a translucent region, and a menu display unit mounted on a rear surface of the manipulation unit and configured to display the menu selected by the scroll unit through the translucent region.

26 Claims, 23 Drawing Sheets

INPUT DEVICE, MOBILE TERMINAL HAVING THE SAME, AND USER INTERFACE THEREOF

This application claims the benefit of Korean Application Nos. 10-2007-0057415 and 10-2007-0062428 filed on Jun. 12, 2007 and Jun. 25, 2007, respectively in the Korean Intellectual Property Office, the disclosures of which are incorporated herein by reference.

BACKGROUND OF THE INVENTION

1. Field of the Invention

The present invention relates to an input device capable of displaying various menus on a manipulation unit, a mobile terminal having the same, and its user interface.

2. Description of the Related Art

A mobile terminal is portable and has one or more of a voice and video call function, a function of inputting and outputting information, and a function of storing data. The mobile terminal can also capture an image or video, reproduce music or video files, and receive games and a broadcast, and thus functions as a composite multimedia player.

In order to implement the various functions in the multimedia device, the mobile terminal includes a user interface allowing a user to easily search or select the functions provided. In addition, as the mobile terminal is increasingly considered as a necessity and a personal belonging, it is preferable to provide mobile terminals with a variety of designs.

Meanwhile, a typical keypad mounted on the mobile terminal is not convenient in that some keys need to be repeatedly pressed or touched in order to search a large amount of contents. Moreover, the related art interface with one main display unit on the mobile terminal is insufficient to be able to conveniently utilize the various functions of the mobile terminal.

SUMMARY OF THE INVENTION

Accordingly, one object of the present invention is to address the above-noted and other problems.

Another object of the present invention is to improve the usability of a manipulation unit of a scroll unit for searching a menu or a mode or controlling a function in a mobile electronic device.

Another object of the present invention is to provide a handy input device capable of displaying diverse menus on button keys and facilitating a discrimination between a menu displaying a function to be operated and another menu.

Still another object of the present invention is to diversify visual information provided through a mobile electronic device.

To achieve these and other advantages and in accordance with the purpose of the present invention, as embodied and broadly described herein, the present invention provides in one aspect an input device that includes a scroll unit installed on a case and configured to select a menu, a manipulation unit configured to operate a menu selected by the scroll unit and having a translucent region, and a menu display unit mounted on a rear surface of the manipulation unit and configured to display the menu selected by the scroll unit through the translucent region.

In another aspect, the present invention provides a mobile terminal including a terminal body and an input device that is mounted on the terminal body and is configured to input information. The input device includes a scroll unit configured to select a menu, a manipulation unit configured to operate a menu selected by the scroll unit and having a translucent region, and a menu display unit mounted on a rear surface of the manipulation unit and configured to display the menu selected by the scroll unit on the translucent region.

In another aspect, the present invention provides a mobile terminal that includes a terminal body, a first display unit installed on the terminal body and configured to output first visual information, a scroll unit disposed on the terminal body and configured to allow a scrolling operation, a manipulation unit operatively disposed at a central portion of the scroll unit and having a translucent region, and a second display unit mounted on a rear surface of the manipulation unit and configured to display second visual information at the translucent region.

In another aspect, the present invention provides a user interface of a mobile terminal including a first display unit configured to output first visual information according to each mode of the mobile terminal, a scroll unit disposed on the terminal body such that the scroll unit can be scrolled, a manipulation unit disposed at a central portion of the scroll unit such that the scroll unit can be scrolled and having a translucent region, and a second display unit mounted on a rear surface of the manipulation unit and configured to display second visual information on the translucent region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The exemplary embodiments of the present invention will now be described with reference to the accompanying drawings.

Figure 1:
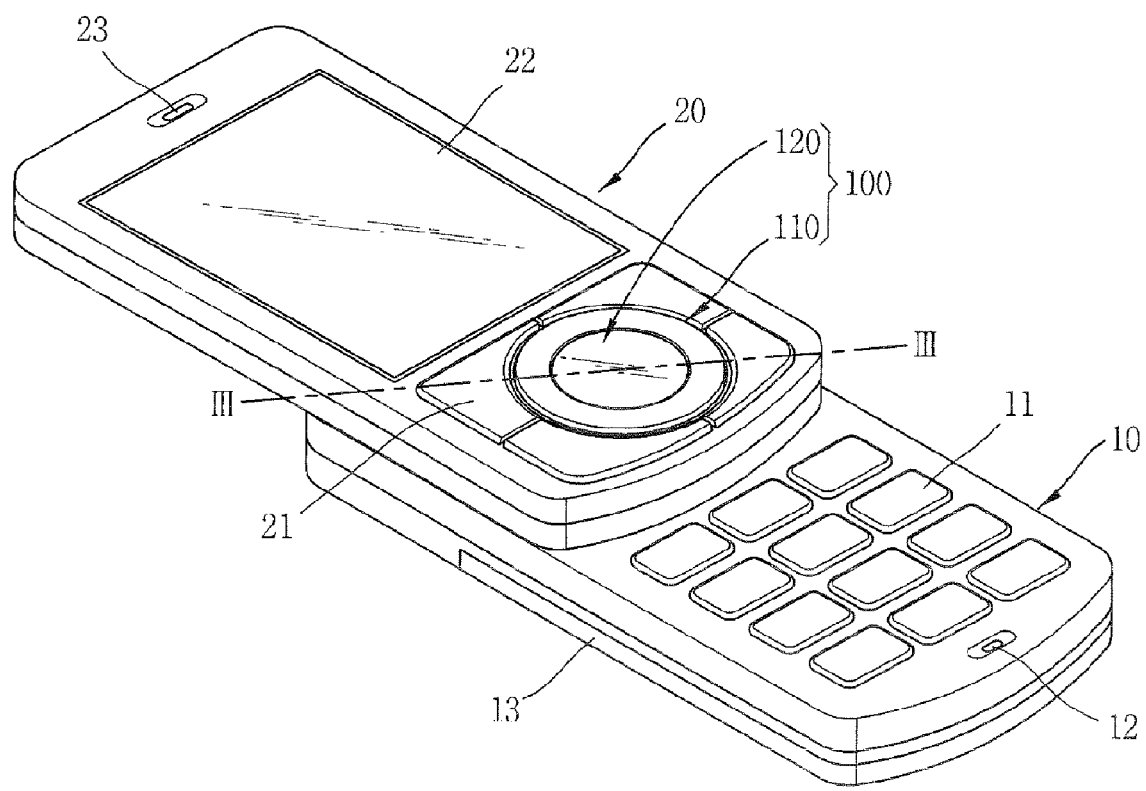
FIG. 1 is a perspective view of a mobile terminal according to a first exemplary embodiment of the present invention.

FIG. 1 is a perspective view of a mobile terminal according to a first exemplary embodiment of the present invention. In this embodiment, a slide type mobile terminal will be described, but various other types of mobile terminal such as a bar type mobile terminal, a folder type mobile terminal or a swivel type mobile terminal, etc., can be also applicable. In addition, in the following description, an input device according to the present invention is applied to the mobile terminal, but it can be also applicable to other mobile electronic devices such as PDA or MP3, etc.

As shown in FIG. 1, the mobile terminal includes a first body 10 and a second body 20 slidably mounted on the first body. Further, a keypad 11 that can input information such as numbers or characters according to a pressing operation by a user is mounted on the first body 10, and a microphone 12 is mounted at a lower side of the keypad 11. A battery 13 is mounted on a rear surface of the first body 10.

Further, an input device 100 is mounted on the second body 20, and auxiliary key buttons 21 that input information according to a pressing operation are installed at the left and right sides of the input device 100. A display 22 is installed at an upper side of the input device 100, and a speaker 23 is mounted at an upper side of the display 22.

Figure 2:
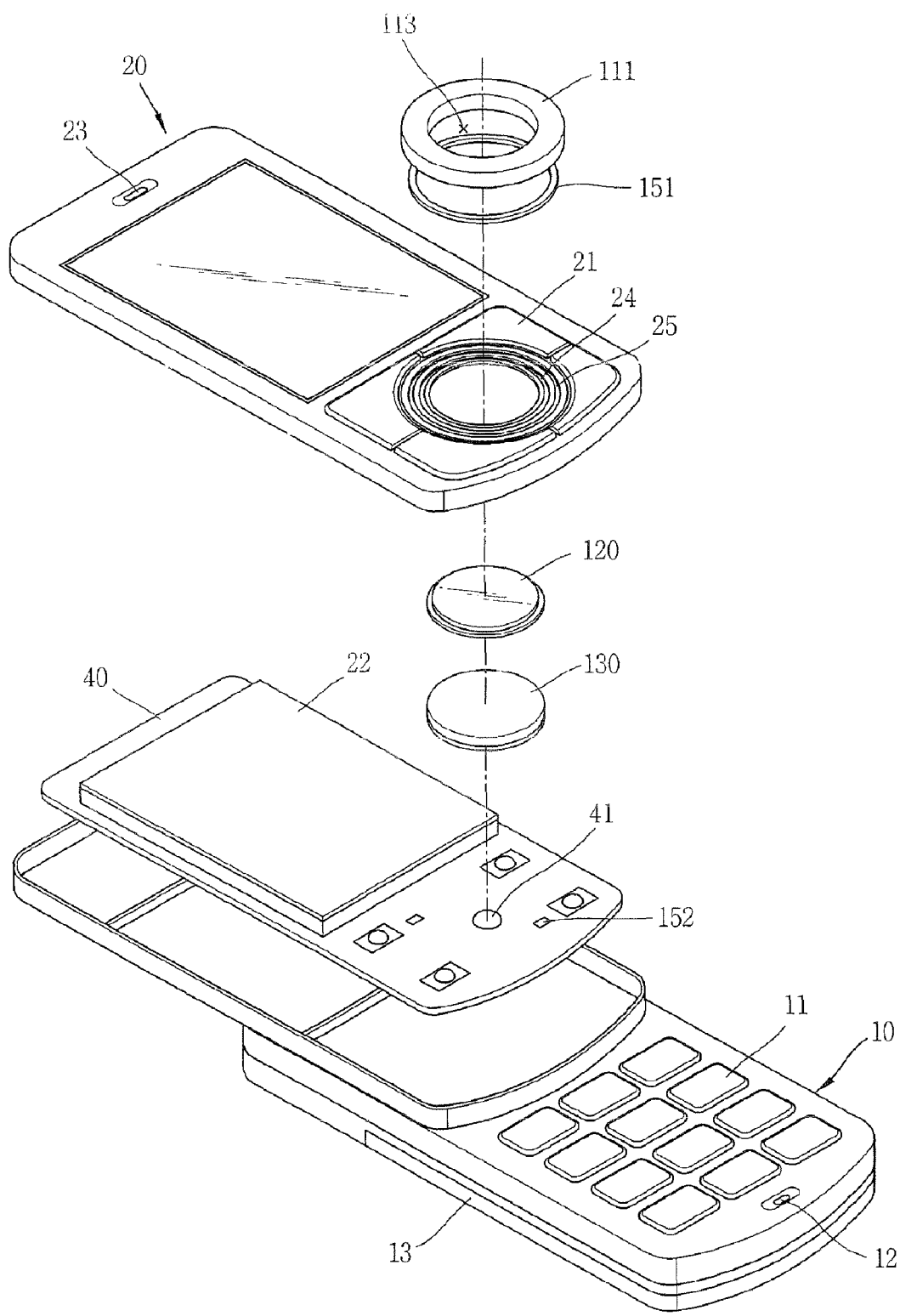
FIG. 2 is an exploded perspective view of the mobile terminal in FIG. 1.
Figure 3:
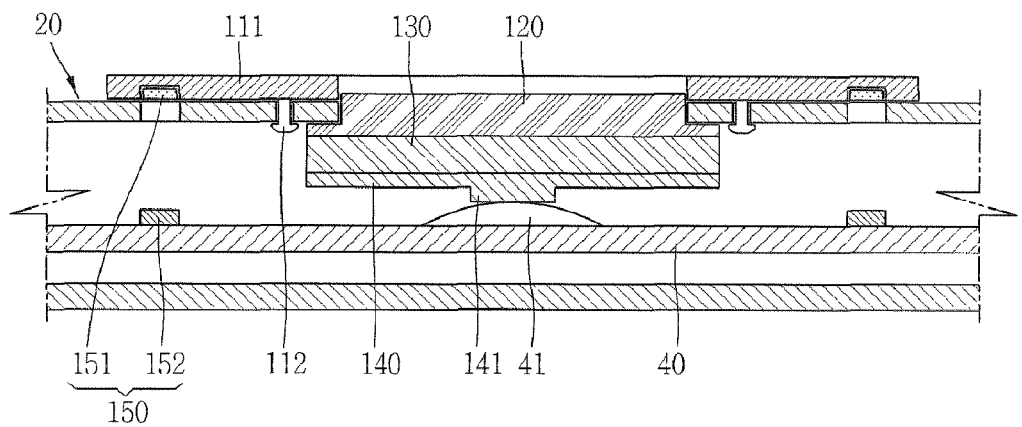
FIG. 3 is a cross-sectional view taken along line III-III of an input device 100 in FIG. 1.

FIG. 2 is an exploded perspective view of the mobile terminal in FIG. 1, and FIG. 3 is a cross-sectional view taken along line III-III of an input device 100 in FIG. 1. As shown in these FIGS., the input unit 100 includes a scroll unit 110 that is installed on the second body 20 and is configured to select a menu, a manipulation unit 120 that operates the menu selected by the scroll unit 110, and a menu display unit 130 that is mounted on a rear surface of the manipulation unit 120 and displays the menu selected by the scroll unit 110 on the manipulation unit 120.

Further, the scroll unit 110 includes a scroll key 111 rotatably installed on the second body 20, and a sensing unit 150 sensing a rotational position of the scroll key 111 and selecting a menu. The scroll key 111 is formed in a circular ring shape, and a guide protrusion 112 is formed on a rear surface of the scroll key 111 and inserted into the guide slot 24 formed on the second body 20. Also, the scroll key 111 is combined on the front surface of the second body 20 such that the guide protrusion 112 is inserted into the guide slot 24, and after the scroll key 111 is combined on the second body 20, an end of the guide protrusion 112 is thermally fused.

In addition, a width of the end portion of the guide protrusion 112 is greater than that of the guide slot 24 after the thermal fusion, so that the end portion of the guide protrusion 112 is caught by the guide slot 24 to prevent the scroll key 111 from being released from the second body 20. Further, the scroll key 111 may be made of plastic or a metal material. Moreover, when a user applies a rotational force to the scroll key 111 in a clockwise or counterclockwise direction, the guide protrusion 112 is moved along the guide slot 24, and accordingly, the scroll key 111 is rotated on the second body 20.

Further, the sensing unit 150 includes a magnet 151 attached along a circumferential direction on a rear surface of the scroll key 111, and a magnetic sensor 152 that senses a magnetic field generated from the magnet 151. The magnet 151 is formed in a circular ring shape, and mounted on the rear surface of the scroll key 111. The magnetic sensor 152 senses a rotational position of the magnet 151 and is mounted on a PCB (Printed Circuit Board) 40 mounted within the second body 200. In addition, the magnetic sensor 152 is a sensor that reacts to the magnetic field generated from the magnet 151. Therefore, when the magnet 151 attached on the rear surface of the scroll key 111 according to the rotation of the scroll key 111 and passes on the magnetic sensor 152, the magnetic sensor 152 senses the magnet 151 and inputs a corresponding signal to the PCB 40.

In addition, the manipulation unit 120 is mounted on a through hole 113 located at the central portion of the scroll key 111. The manipulation unit 120 is also formed in a circular shape corresponding to the through hole 113, and includes a translucent region in order to display content displayed on the menu display unit 130 through the translucent region. The translucent region may be formed on the entire region or on a portion of the manipulation unit 120.

Further, the manipulation unit 120 may be provided in the form of a push key that can be pressed. The menu display unit 130 that displays information on the manipulation unit 120 is mounted on the rear surface of the manipulation unit 120. For the menu display unit 130, an LCD (Liquid Crystal Display) or multiple LEDs (Light Emitting diodes) may be used.

In addition, a push protrusion 141 is formed on the menu display unit 130 in order to press a switch 41 mounted on the PCB 40 according to a pressing operation of the manipulation unit 120. Further, a plate 140 with the push protrusion 141 formed thereon is mounted on the rear surface of the menu display unit 130.

Figure 4:
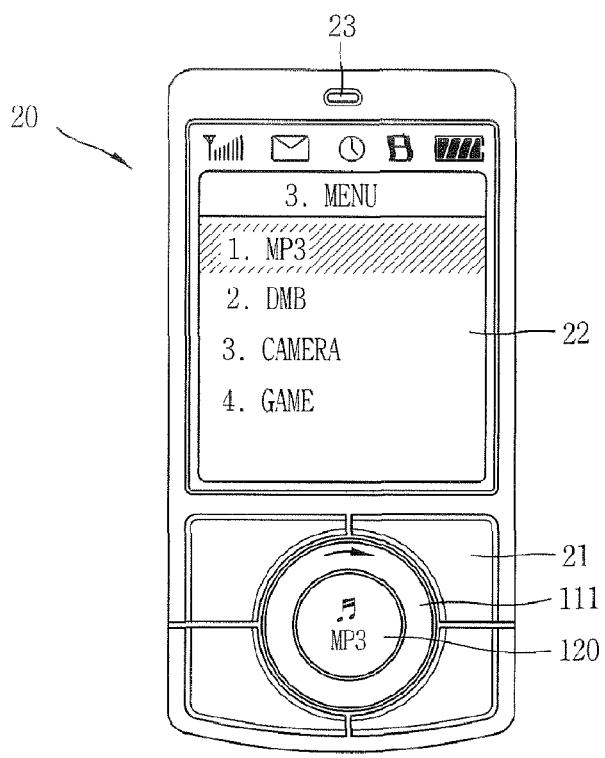
FIGS. 4 and 5 are front views of the mobile terminal according to the first exemplary embodiment of the present invention.
Figure 5:
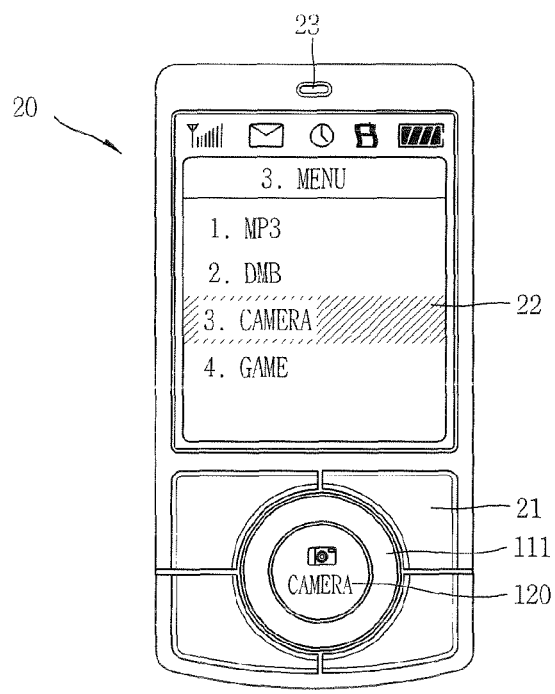

Next, FIGS. 4 and 5 are front views of the mobile terminal according to the first exemplary embodiment of the present invention. The operation of the input device 100 constructed as described above will now be described with reference to FIGS. 4 and 5.

The display 22 of the mobile terminal displays menus for activating various functions (e.g. MP3, DMB, camera and game functions) of the mobile terminal. As shown in FIG. 4, when the menu for operating the MP3 function is selected on the display 22, the menu for operating the MP3 function is also displayed on the manipulation unit 120. When the LCD is used for the menu display unit 130, a picture, an icon, a photograph or animation effect, etc., for visually displaying the menu for operating the function of the MP3 or the camera is displayed on the manipulation unit 120. In addition, when the LEDs are used as the menu display unit 130, a character or a number for displaying a menu is displayed by combining blinking operations of the LEDs.

Further, when the menu for operating the MP3 function is selected, if the user wants to select the menu for operating the camera function, as shown in FIG. 5, the user rotates the scroll key 111 clockwise to change the menu. When the menu for operating the camera function is selected by the rotation of the scroll key 111, the menu for operating the camera function is also displayed on the manipulation unit 120. Then, when the user presses the manipulation unit 120 on which the menu for operating the camera function is displayed, the camera function of the mobile terminal is activated.

Further, the above description describes the menu being displayed on the manipulation unit 120 while the corresponding menu is displayed on the display 22. Furthermore, in the input device 100, it is also possible that while the display 22 is turned off and thus displays no menu on the display 22, the scroll key 111 is rotated to display a menu on the manipulation unit 120.

Figure 6:
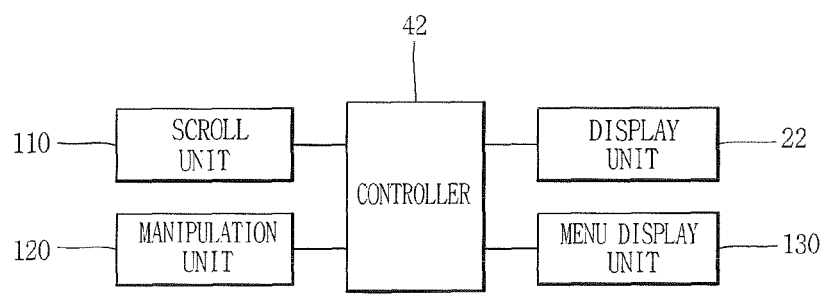
FIG. 6 is a block diagram illustrating the mobile terminal according to the first exemplary embodiment of the present invention.

Next, FIG. 6 is a block diagram illustrating the mobile terminal according to the first exemplary embodiment of the present invention. A controller 42 receives a signal for selecting a menu from the scroll unit 110. The controller 42 also transmits a signal for visually indicating a menu selection to the display 22 and to the menu display unit 130 to allow the selected menu to be displayed on the manipulation unit 120.

When the user wants to operate a function of the selected menu, he or she may press the manipulation unit 120 with a menu displayed thereon. Then, the signal is transmitted to the controller 42. The controller 42 transmits signals for activating various functions of the mobile terminal to components (a camera module, an MP3 module, etc.) of the mobile terminal. Accordingly, the user's desired functions are activated on the mobile terminal.

Figure 7:
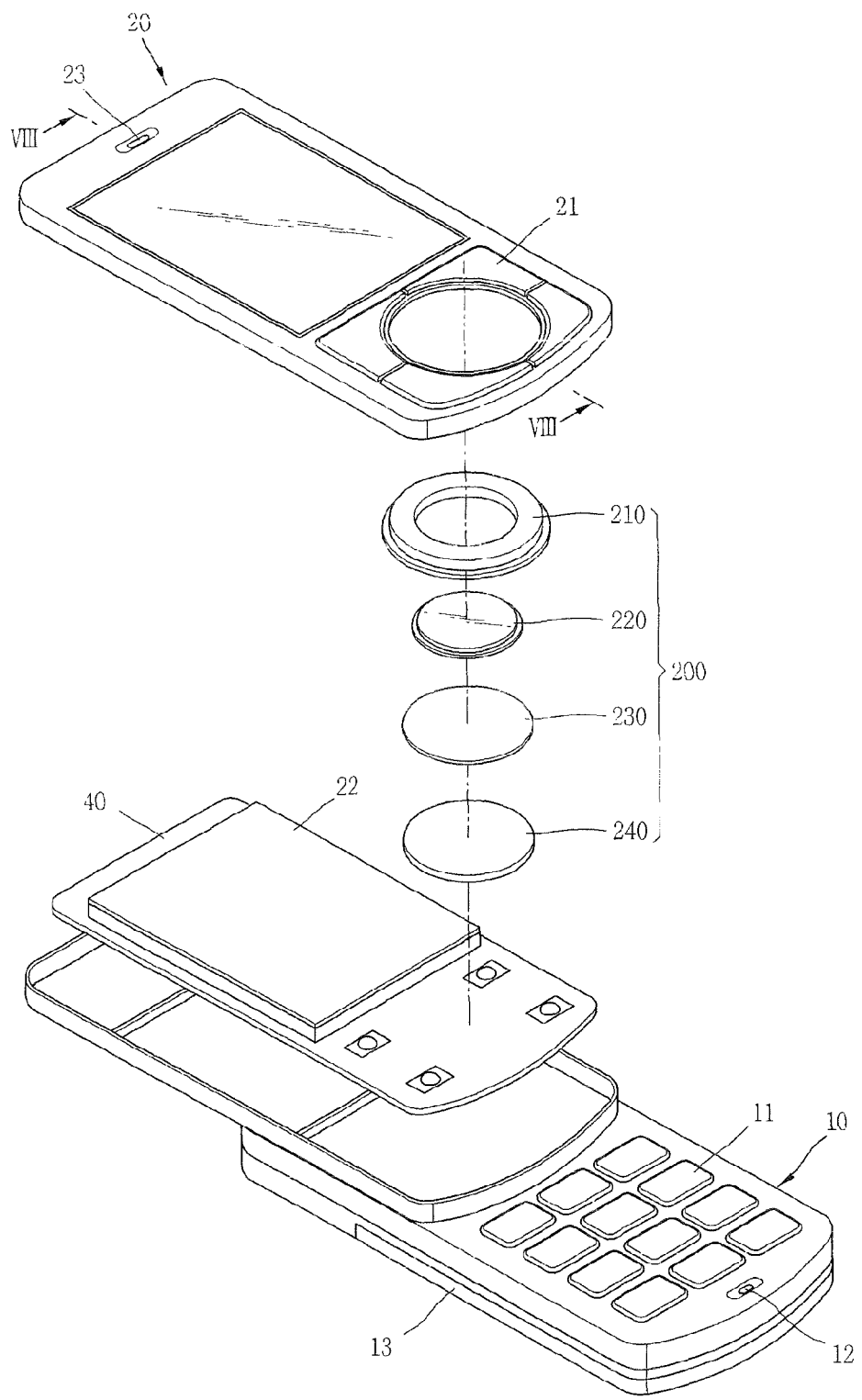
FIG. 7 is an exploded perspective view of a mobile terminal according to a second exemplary embodiment of the present invention.
Figure 8:
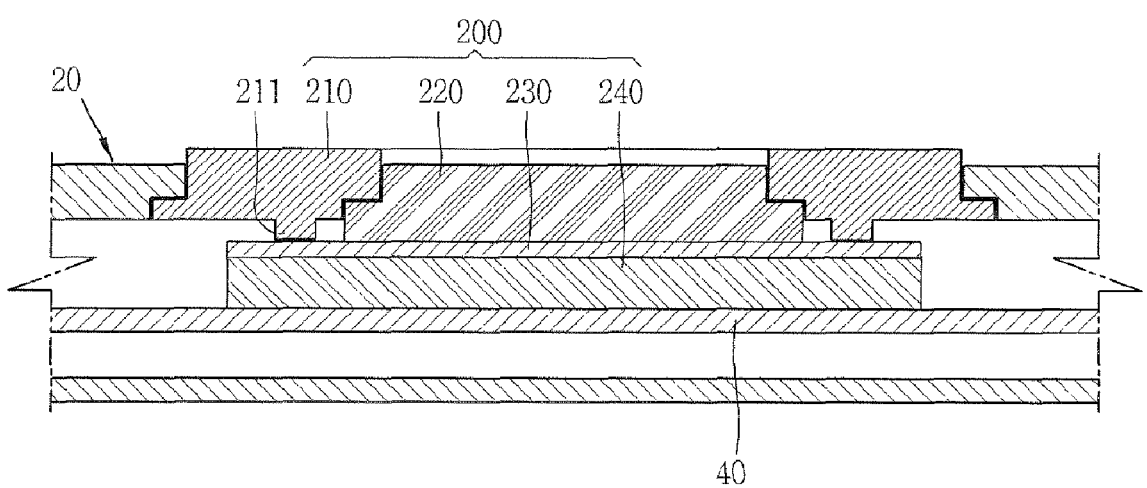
FIG. 8 is a cross-sectional view taken along line VIII-VIII of the mobile terminal in FIG. 7.

FIG. 7 is an exploded perspective view of a mobile terminal according to a second exemplary embodiment of the present invention, and FIG. 8 is a cross-sectional view taken along line VIII-VIII of the mobile terminal in FIG. 7. The same reference numerals are given the same elements as those in the first exemplary embodiment of the present invention and a description therefore will be omitted.

An input device 200 according to the second exemplary embodiment of the present invention includes a scroll unit that is installed on the second body 20 and is configured to select a menu, a manipulation unit 220 that operates the menu selected by the scroll unit and includes a translucent region, and a menu display unit 240 that is mounted on a rear surface of the manipulation unit 220 and displays the menu selected by the scroll unit through the translucent region.

Further, the manipulation unit 220 of the input device 200 is mounted as a touch key on the second body 20 to allow a signal to be inputted according to a touch. A touch pad 230 that senses a touch applied to the manipulation unit 220 is mounted on the rear surface of the manipulation unit 220.

For the touch pad 230, a pressure sensor that senses pressure applied to the manipulation unit 220 may be used. The touch pad 230 can be formed as a film made of a transparent material to allow a screen image outputted from the menu display unit 240 to be displayed thereon. The film type touch pad can be, for example, an ITO (Indium Tin Oxide) film. Likewise as in the first exemplary embodiment of the present invention, as the menu display unit 240, the LCD or the LEDs may be used, and in order to reduce the thickness of the mobile terminal, a flexible LCD may be used.

In addition, a scroll key 210 in the form of a circular ring that surrounds a touch key 230 is mounted on the circumference of the manipulation unit 220. The scroll key 210 is mounted on a front surface of the touch pad 230, and in the second exemplary embodiment of the present invention, the scroll key 210 is not scrolled according to such rotational movement as that of the scroll key 110 in the first exemplary embodiment of the present invention, but is scrolled as the user touches the front surface of the scroll key 210 while the scroll key 210 is fixed on the second body 20.

Further, an operation protrusion 211 for transferring the touch scroll operation of the scroll key 210 to the touch pad 230 is formed on the rear surface of the scroll key 210. When the scroll key 210 is touch-scrolled, the operation protrusion 211 formed on the lower surface of the scroll key 210 transfers the touch to the touch pad 230. Then, the touch pad 230 senses the touch and outputs a selected menu in the form of a character or a picture onto the menu display unit 230 (the LCD or the flexible LCD, etc.). Then, the user can view the outputted menu through the manipulation unit 220. Here, the touch pad 230 serves to sense the touch of the manipulation unit 220 and also to sense that the front surface of the scroll key 210 is touch-scrolled.

The operation of the input device 200 according to the second exemplary embodiment of the present invention is similar to that of the input device in the first exemplary embodiment of the present invention, so its description will be omitted.

Figure 9:
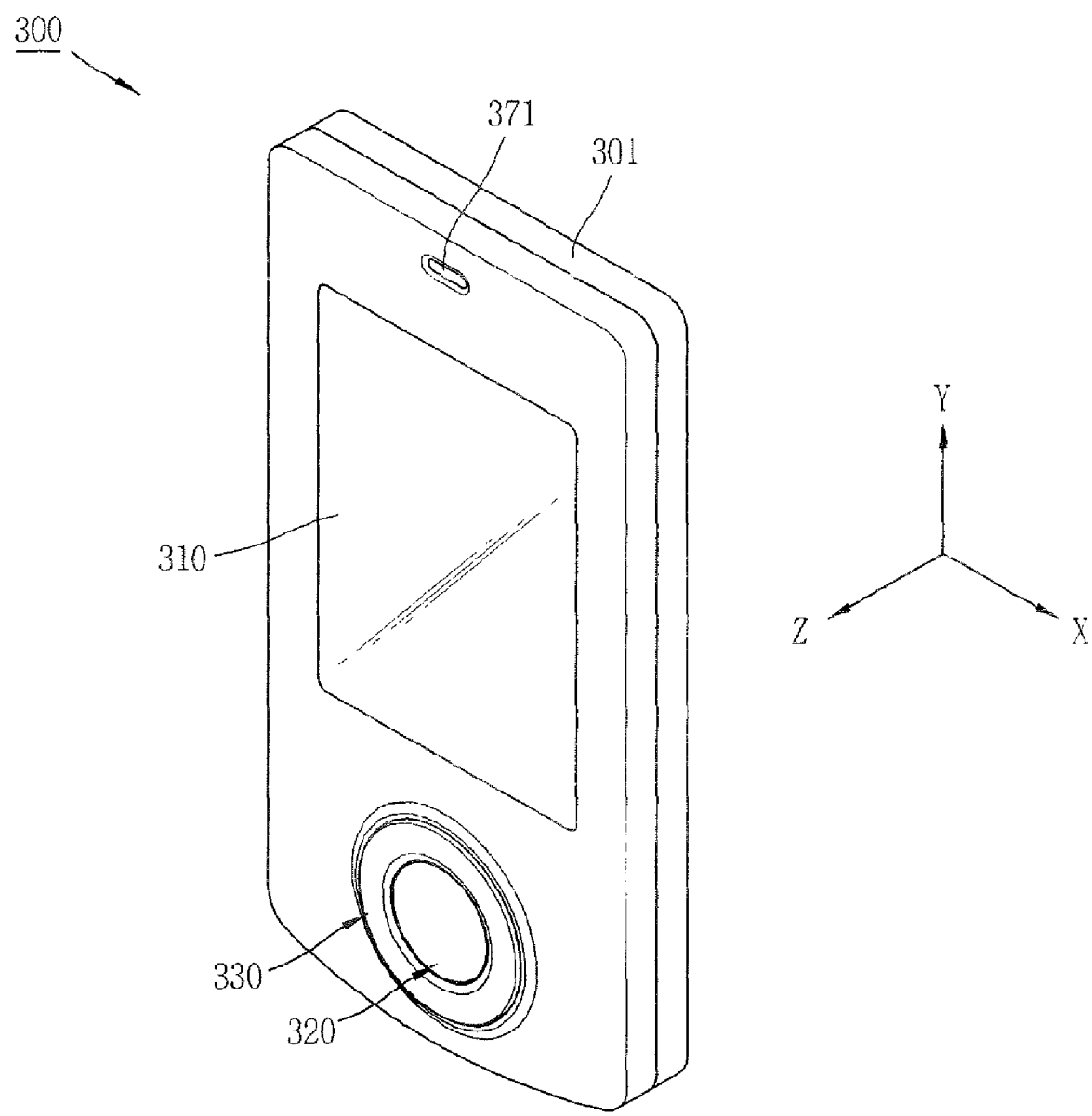
FIG. 9 is a front perspective view of a mobile terminal according to a third exemplary embodiment of the present invention.

Next, FIG. 9 is a front perspective view of a mobile terminal 300 according to a third exemplary embodiment of the present invention. As shown in FIG. 9, the mobile terminal 300 includes a terminal body 301 constituting the outer appearance of the device, a first display unit 310, a manipulation unit 320 and a scroll unit 330 installed on the front surface of the terminal body 310. Here, a front side refers to a Z direction and an upper side refers to a Y direction.

A speaker 371 that outputs sound information such as a notification sound or a call sound is provided on an upper portion of the terminal body 301. Further, the first display unit 310 outputs first visual information according to various modes of the mobile terminal 300. Namely, the first display unit 310 displays content inputted through a keypad unit or visually displays a usage state of the terminal or a state of reproduced multimedia, or can be a view finder of a camera unit.

As shown, the scroll unit 330 is formed at a lower side of the first display unit 310, and can be scrolled. The scroll unit 330 is used for searching the mobile terminal 300 or controlling various functions. The scroll unit 330 includes a substantially rotatable unit and allows a cursor or a pointer to be moved quickly to a corresponding item according to a direction or speed at which the rotatable unit is rotated. Also, the manipulation unit 320 is formed to select or execute (enter) an item searched by the scrolling unit 330 according to a pressing operation.

Figure 10:
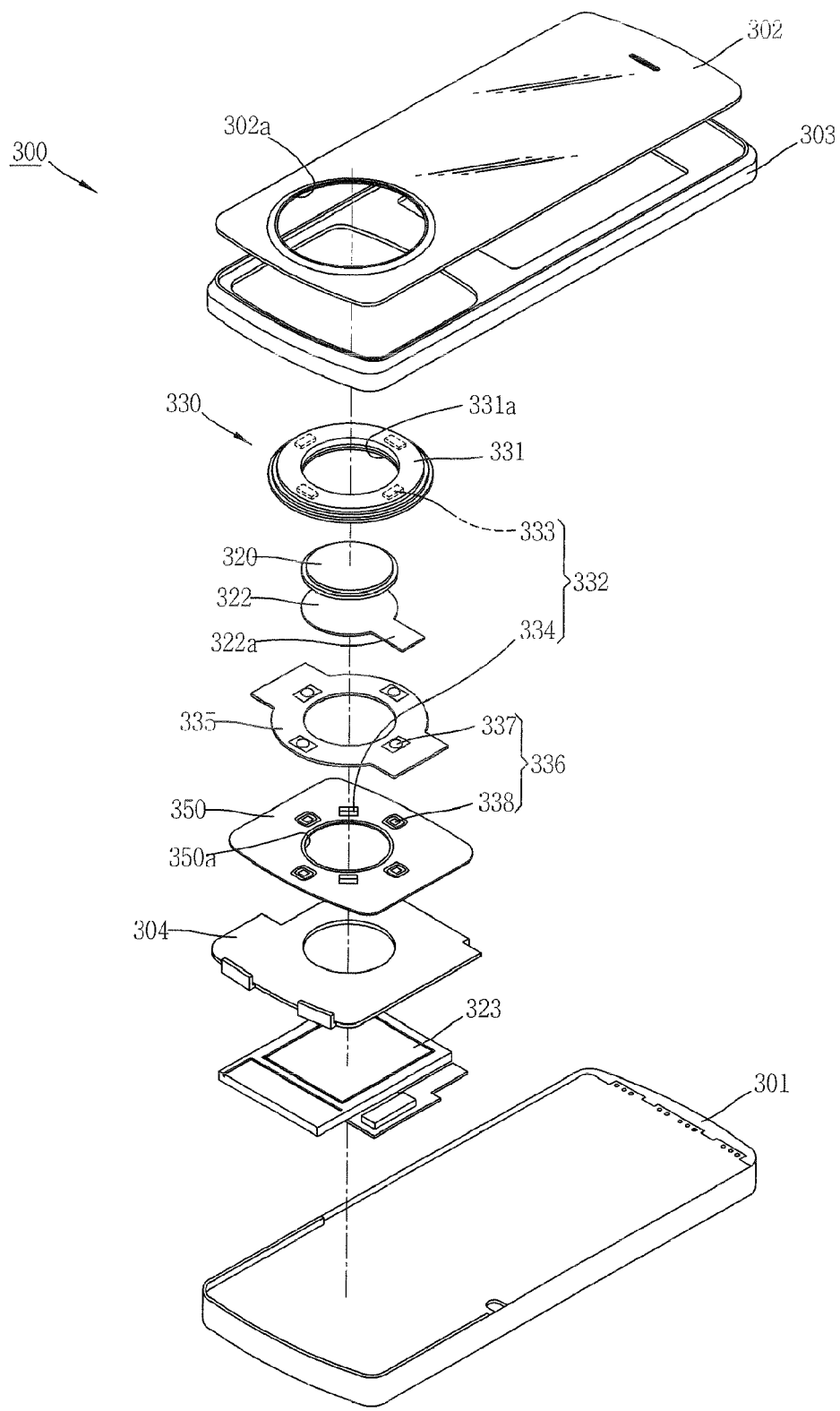
FIG. 10 is an exploded perspective view of the mobile terminal 300 in FIG. 9.

Next, FIG. 10 is an exploded perspective view of the mobile terminal 300 in FIG. 9. As shown in FIG. 10, a cover 302 with an installation hole 302a allowing the scroll unit 330 to be installed therein and a frame 303 on which the cover 302 is supportedly mounted are provided on an outer surface of the terminal body 301.

The scroll unit 330 is disposed to be rotatable on the surface of the terminal body 301, and includes a rotary wheel 331 with a through hole formed at the center thereof and a rotation sensing unit 332 that senses rotation of the rotary wheel 331. The translucent manipulation unit 320 is disposed at the center of the scroll unit 330, and a touch sensing unit 322, a dome sheet 335, a printed board 350, a support member 304, a second display unit 323 are sequentially stacked at the lower side of the manipulation unit 320 to form an assembly.

The touch sensing unit 322 senses a touch applied to the manipulation unit 320 and includes a portion 322a formed at one side thereof, which is to be connected with the printed board 350. For the touch sensing unit 322, a translucent conductive film, e.g., a thin film made of ITO (Indium Tin Oxide) or CNT (Carbon Nano Tube), etc., may be used. The touch sensing unit 322 is disposed at an outer side of the manipulation unit 320, and the number of the touch sensing units 322 is controlled according to a resistive film method in which pressure is used according to a touching method and/or according to an electrostatic capacity (capacitance) method in which a change in capacitance is sensed.

In addition, the dome sheet 335 is formed such that metal domes 137 that cover contact points 338 are attached on a plastic sheet. The contact points 338 are disposed around the through hole 350a of the printed board 350. Also, the metal domes 337 and the contact points 338 form a first switch unit 336 of the scroll unit 130.

Accordingly, when the rotary wheel 331 is pressed, the metal dome 337 corresponding to the pressed portion is pressed to be connected with the contact point 338 so as to be conducted to generate an input signal. Further, the rotation sensing unit 332 that senses rotation of the rotary wheel 331 is provided around the through hole 350a of the printed board 350. The rotation sensing unit 332 includes a magnet 333 fixed on the rotary wheel 331 and rotated together with the rotation of the rotary wheel 331 and a magnetic sensor 334 disposed on a rotation trace of the magnet 333 and sensing a magnetic field of the magnet 333.

Accordingly, when the rotary wheel 331 is rotated, the magnet 333 is also rotated and the magnetic sensor 334 senses whether the magnetic field of the magnet 333 is away or close and transmits a signal from sensing. The mobile terminal 300 determines a rotation direction according to the signal applied from the magnetic sensor 334 and also determines an amount of movement of a cursor or a pointer by adding the number of times that the magnet 333 passes the magnetic sensor 334. Also, instead of the magnet 333 and the magnetic sensor 334, the rotation sensing unit 332 for sensing the rotation of the rotary wheel 331 may include a light emitting unit and an optical sensor that senses light of the light emitting unit.

Further, a second display unit 323 that outputs second visual information is provided in the PCB 350 and the support member 304. The second visual information includes visual information that can be changed. To allow the changeable visual information, the second display unit 323 may be formed as the LCD, organic light emitting diodes (OLEDs) or LEDs. The second visual information outputted to the user from the second display unit 323 is limited by the through hole 331a of the rotary wheel 331.

In addition, a touch applied to the manipulation unit 320 is sensed by the touch sensing unit 322 disposed at an inner side of the manipulation unit 321. Further, a control command recognized by the touch sensing unit 322 varies according to content indicated by the second visual information. For example, when the function controlled by the mobile terminal 300 is related to audio or video, the touch signal may act as 'OK' with respect to the function. With such a structure, the scroll unit 330 facilitates performing of searching or controlling function with respect to various lists displayed on the mobile terminal 300.

In addition, because the manipulation unit 320 and the second display unit 323 are disposed at the central portion of the scroll unit 330, the usability of the scroll unit 330 is enhanced. Also, the manipulation unit 320 and the second display unit 323 may visually display each executed mode together with the first display unit 310, may guide a manipulation function that can be controlled by the scroll unit 330, or may handle a command or input operation according to a mode.

Figure 11:
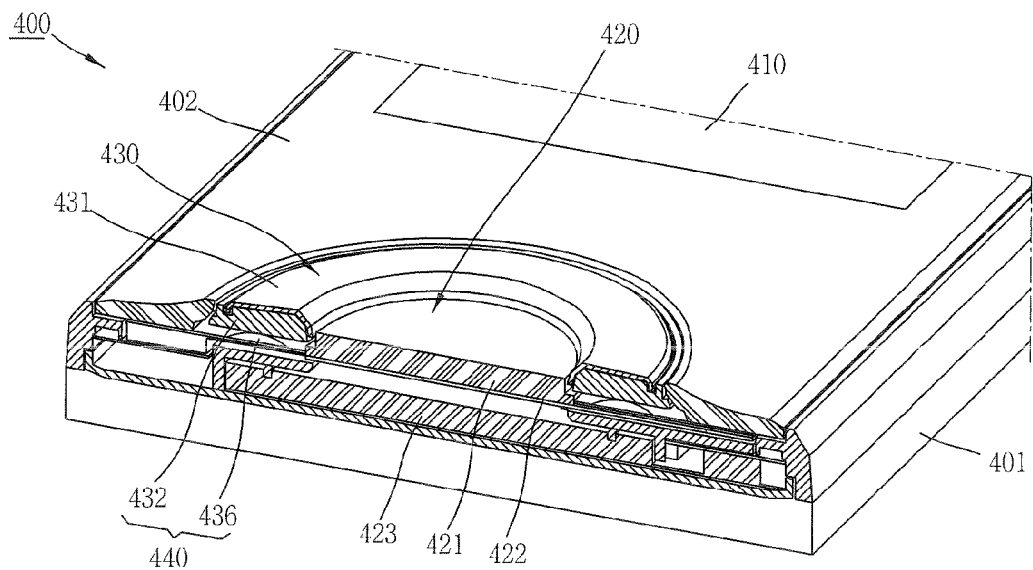
FIG. 11 is a perspective view showing a section of a mobile terminal 400 according to a fourth exemplary embodiment of the present invention.

Next, FIG. 11 is a perspective view showing a section of a mobile terminal 400 according to a fourth exemplary embodiment of the present invention. As shown, a scroll unit 430 according the fourth exemplary embodiment of the present invention includes a touch wheel 431 with a through hole formed at the center thereof, and a touch scroll sensing unit 432 that senses a touch scroll applied for the touch wheel 431.

In addition, the touch wheel 431 is disposed on the same plane as the surface of a terminal body 401, and the touch scroll sensing unit 432 is disposed on a rear surface of the touch wheel 431. Accordingly, when the user contacts his finger on the touch wheel 431 and rotates his finger along the touch wheel 431, the touch scroll sensing unit 432 senses a change in the contact position of the finger and recognizes it as a direction movement signal. Further, multiple second switch units 436 may be disposed along a circumferential direction of the touch wheel 431, and each second switch unit 436 is operated according to a pressing operation of the touch wheel 431.

As shown, a translucent manipulation unit 421, a touch sensing unit 422 and a second display unit 423 are provided in the through hole of the touch wheel 431. When there is a rotation of a contact portion of the user's finger touching the touch wheel 431, second visual information outputted by the second display unit 423 also changes accordingly.

Figure 12:
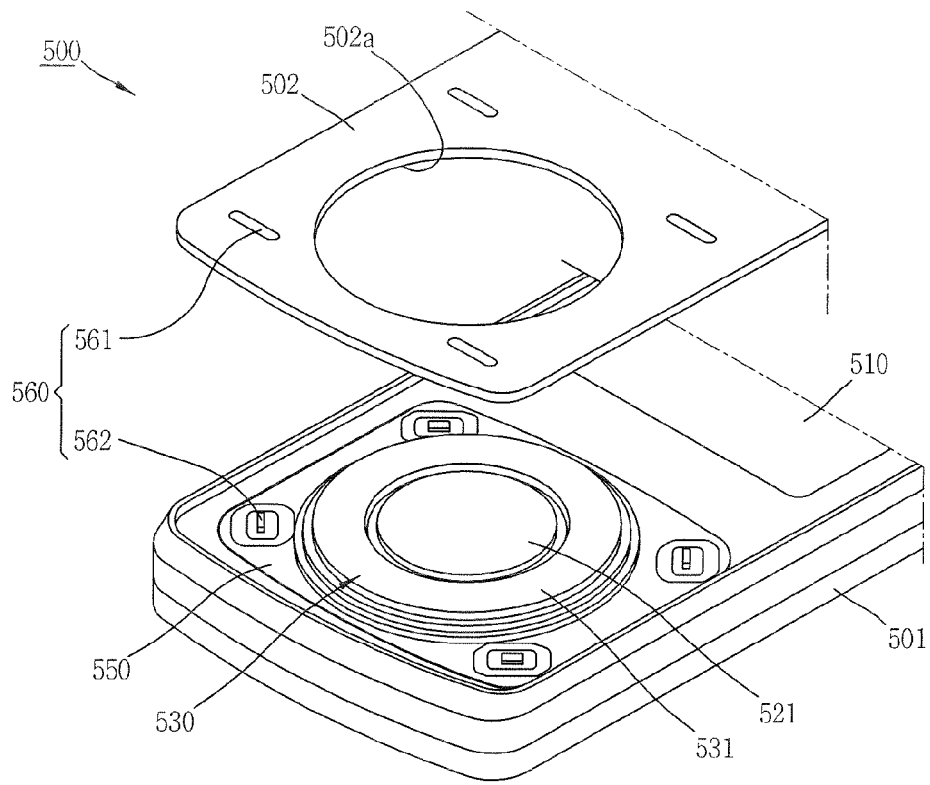
FIG. 12 is a partial exploded perspective view of a mobile terminal 500 according to a fifth exemplary embodiment of the present invention.

Next, FIG. 12 is a partial exploded perspective view of a mobile terminal 500 according to a fifth exemplary embodiment of the present invention. As shown, an auxiliary manipulation unit 560 is provided around a touch wheel or a rotary wheel 531. Also, the auxiliary manipulation unit 560 includes key units 561 formed on a cover 502 and second switch units 562 disposed within the key units 561. The auxiliary manipulation unit 560 performs inputting in a touch manner or in a push manner. In FIG. 12, the second switch unit 562 shows an example of having a touch sensing unit for sensing a touch applied to the key unit 561. In this instance, the switch unit 562 is preferably mounted on a PCB 550.

Figure 13:
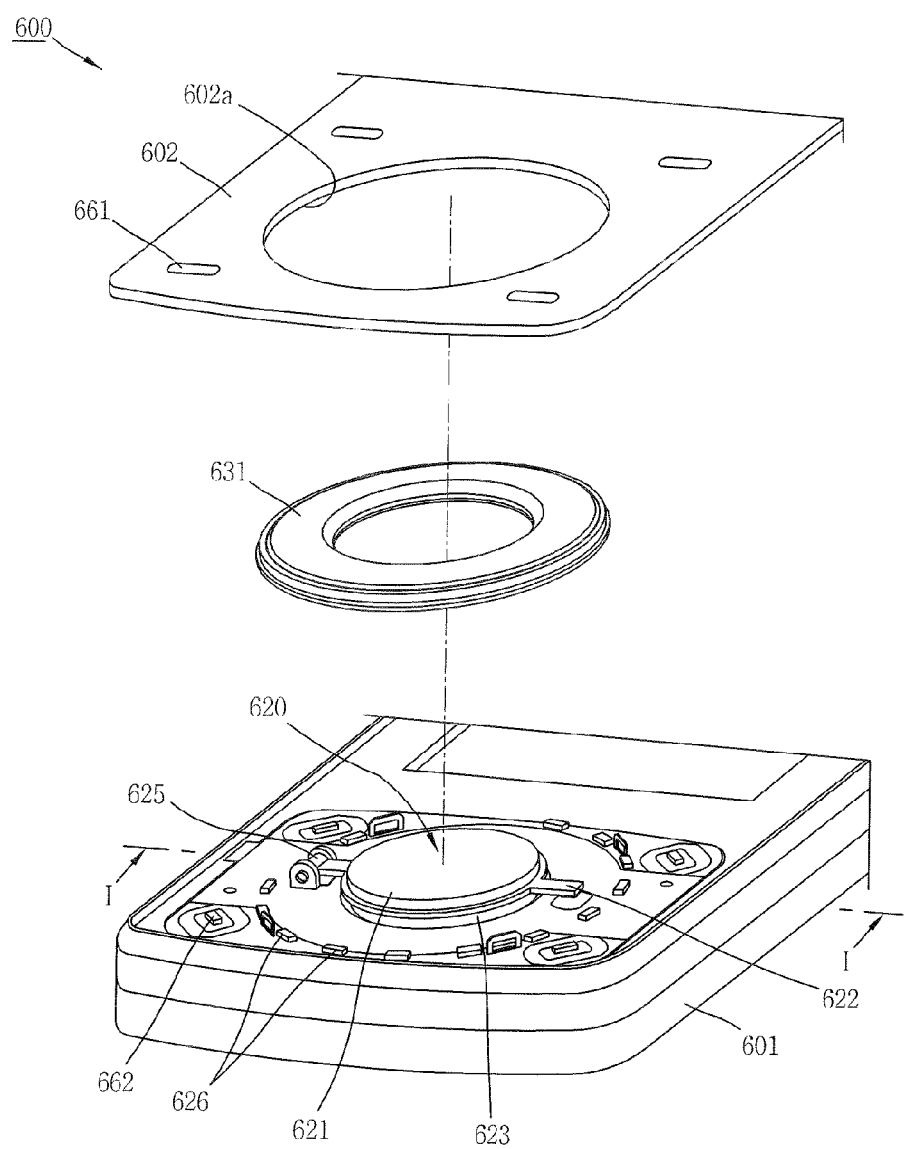
FIG. 13 is a partial exploded perspective view of a mobile terminal according to a sixth exemplary embodiment of the present invention.
Figure 14:
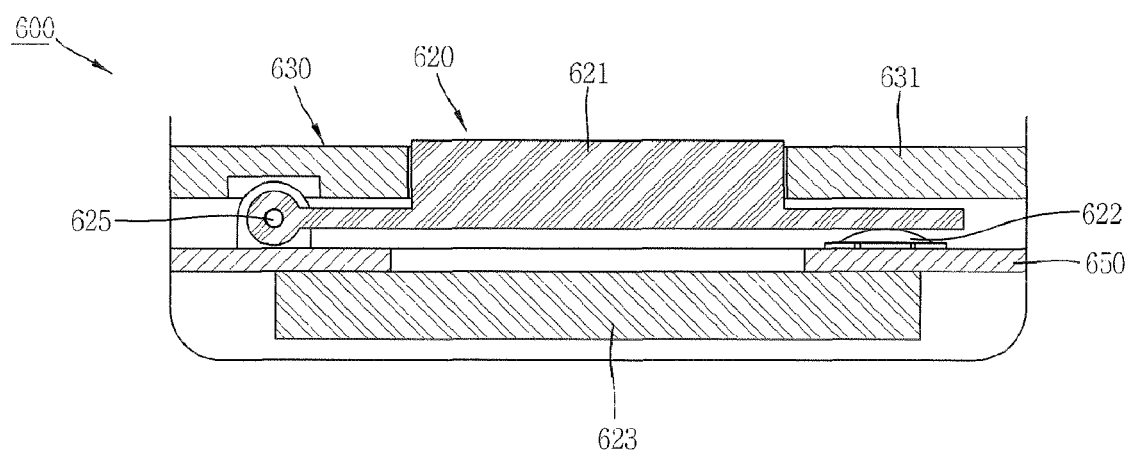
FIG. 14 is a cross-sectional view of an assembled mobile terminal in FIG. 13.

FIG. 13 is a partial exploded perspective view of a mobile terminal 600 according to a sixth exemplary embodiment of the present invention, and FIG. 14 is a cross-sectional view of an assembled mobile terminal in FIG. 13. As shown in FIGS. 13 and 14, the mobile terminal 600 includes a scroll unit 630 that is scroll-manipulated, a manipulation unit 620 disposed to be pressed or touched, and a second display unit 623 that outputs second visual information. The manipulation unit 620 includes a translucent button 621 installed to be pressed at the center of the scroll unit 630 and a fourth switch unit 622 provided at one side of the button 621 and operated according to a pressing operation of the button 621. Further, the button 621 is supported by a hinge or a pivot shaft 625, and a central portion of the button 621 acts as a window allowing a screen image of the internal second display unit 623 to be displayed. Accordingly, when there is a push with respect to the button 621, a corresponding command suitable for the mode is performed.

Figure 15A:
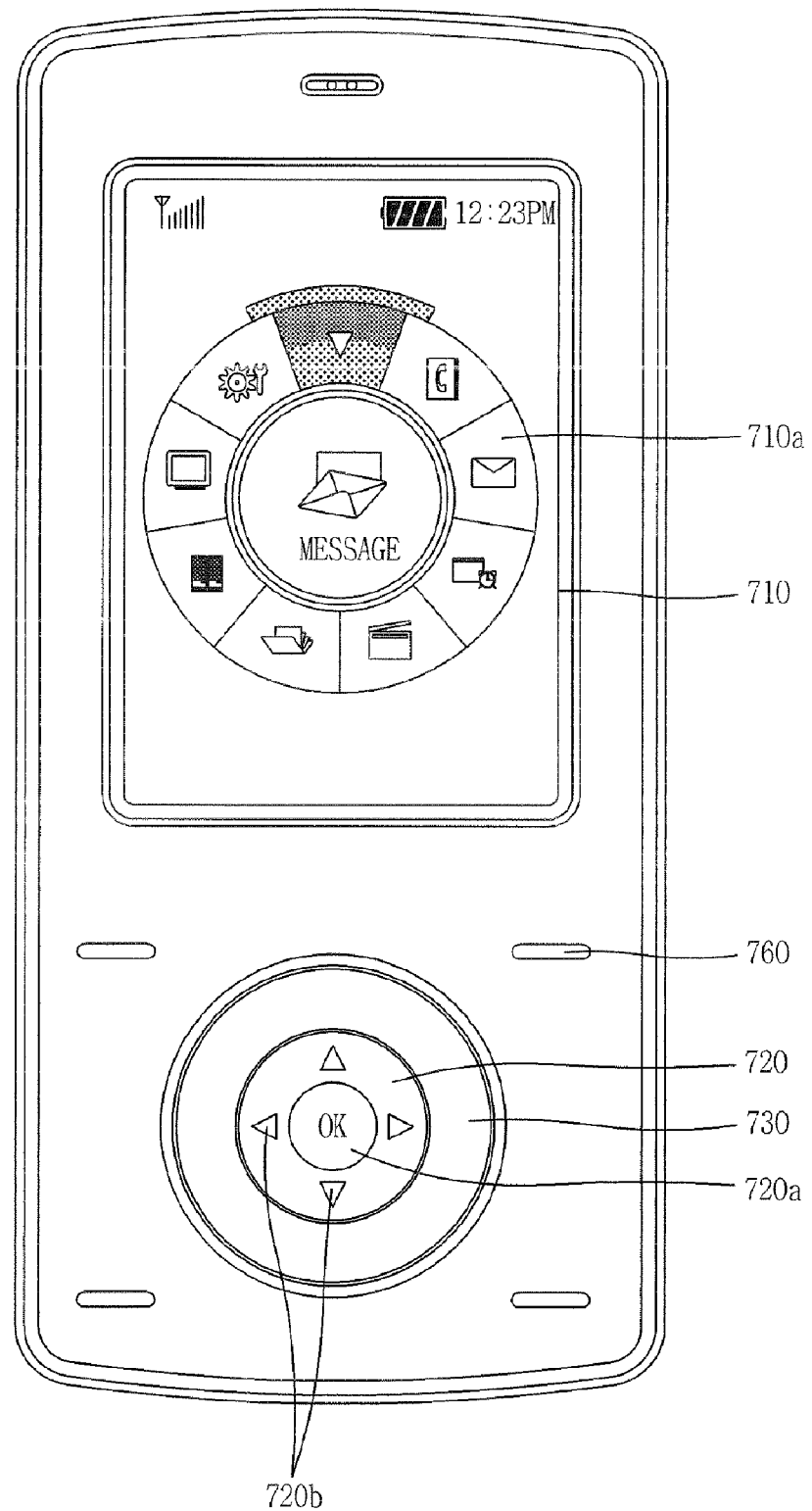
FIGS. 15A to 15D are front views showing operational states of a mobile terminal 700 according to a seventh exemplary embodiment of the present invention.

FIGS. 15A to 15D are front views showing operational states of a mobile terminal 700 according to a seventh exemplary embodiment of the present invention. As shown in FIG. 15A, first visual information outputted from the first display unit 710 may visually display a selectable list 710 that can be executed by the mobile terminal 700. In this instance, a scroll unit 730 controls a movement of a pointer with respect to the menu. Also, a second display unit 720 displays marks 720b indicating directions in which the scroll unit 730 can be manipulated such that they are disposed to be close to corresponding positions of the scroll unit 730. A selected menu can be executed by touching or pushing the manipulation unit disposed on the front surface of the second display unit 720.

For this purpose, the second display unit 720 outputs the mark 'OK' 720a' indicating execution of the menu.

Figure 15B:
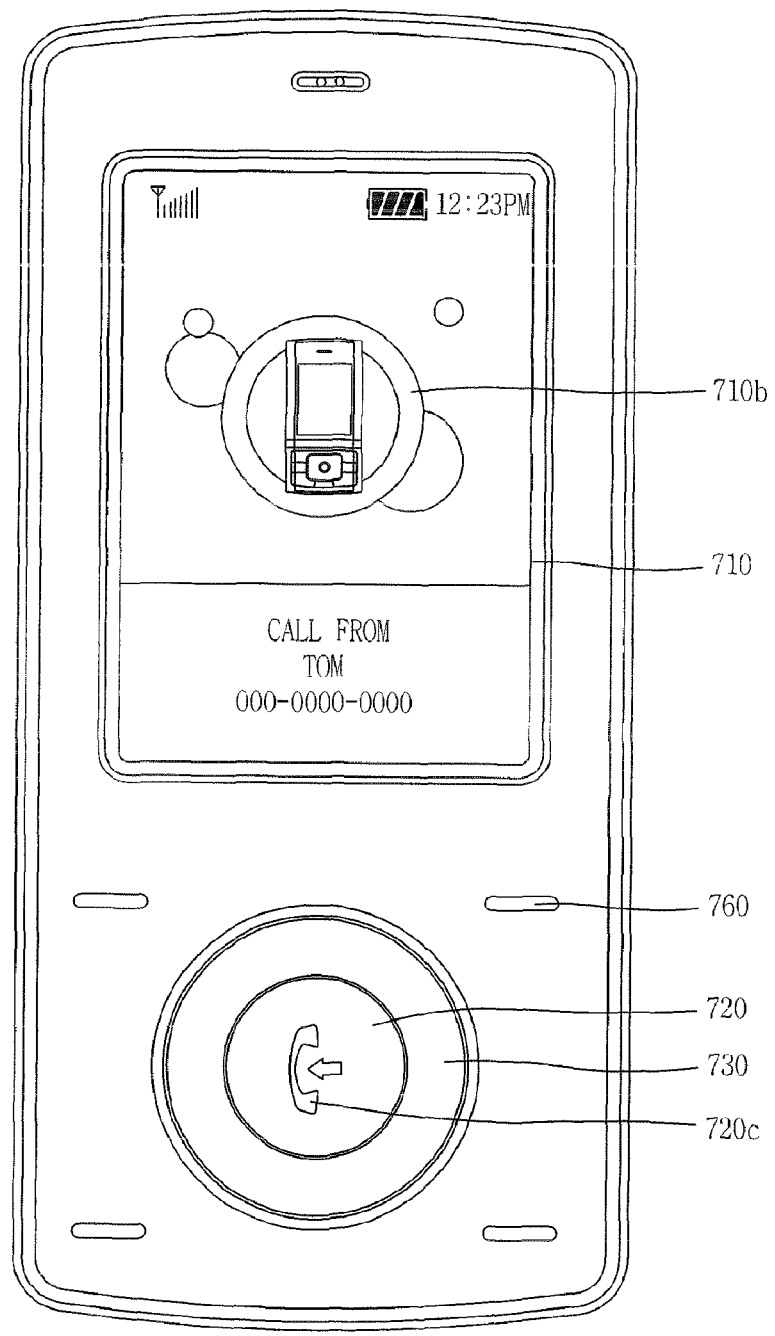

In addition, second visual information outputted through the second display unit 720 can be an icon identifying a mode outputted from the first display unit 710. For example, as shown in FIG. 15B, when a call is received from another party, the first display unit 710 displays first visual information 710b and the second display unit 720 display an icon 720c in order to indicate the state that the call is received.

Figure 15C:
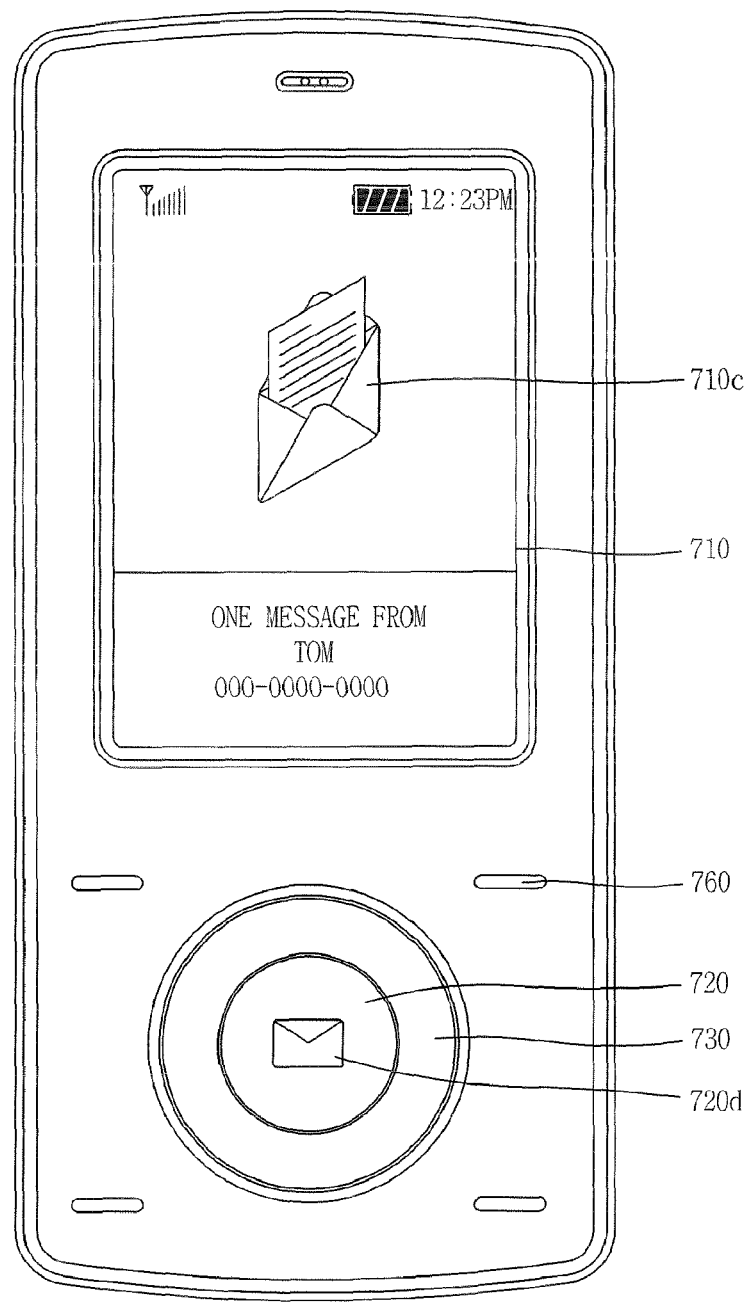
Figure 15D:
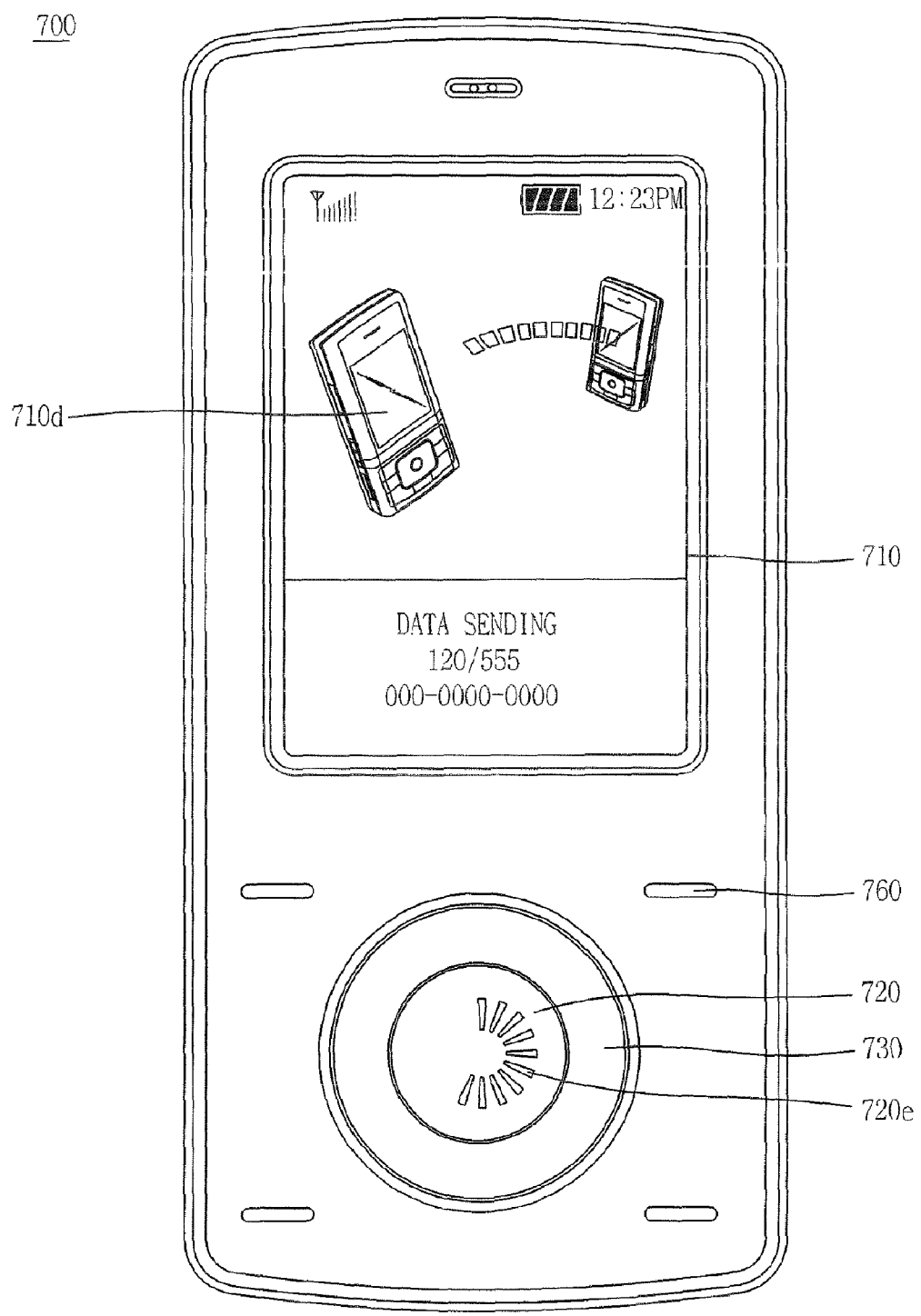

As shown in FIG. 15C, when a message is received from another party, the first and second display units 710 and 720 display the message reception stage in the form of icons 710c and 720d. As shown in FIG. 15D, in the mode in which a text message, a photograph or video is sent, the first display unit 710 displays the first visual information indicating data sending, and the second display unit 720 displays the second visual information 720e indicating data sending.

Figure 16A:
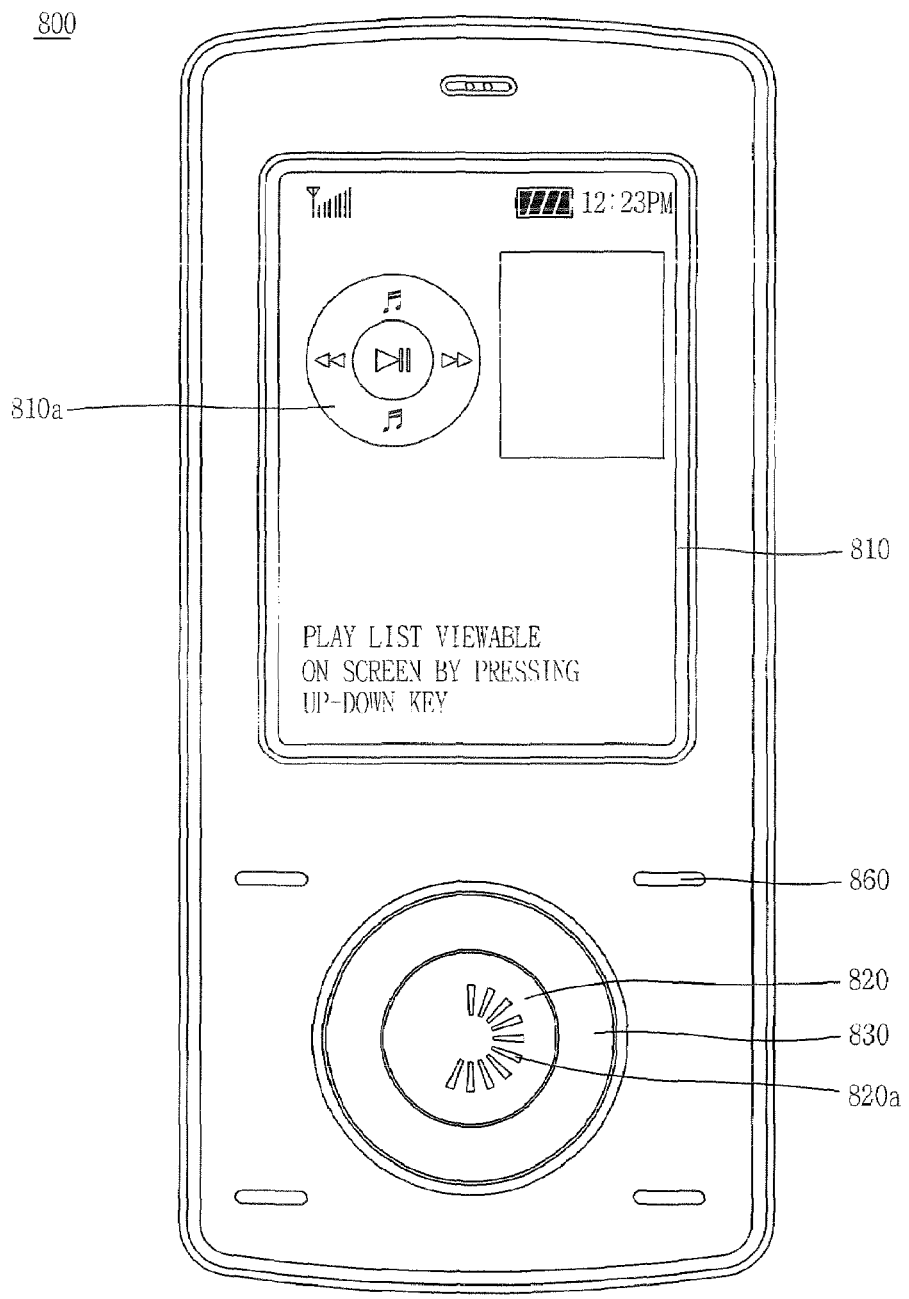
FIGS. 16A to 16C are front views showing operational states of a mobile terminal 800 according to an eighth exemplary embodiment of the present invention.
Figure 16B:
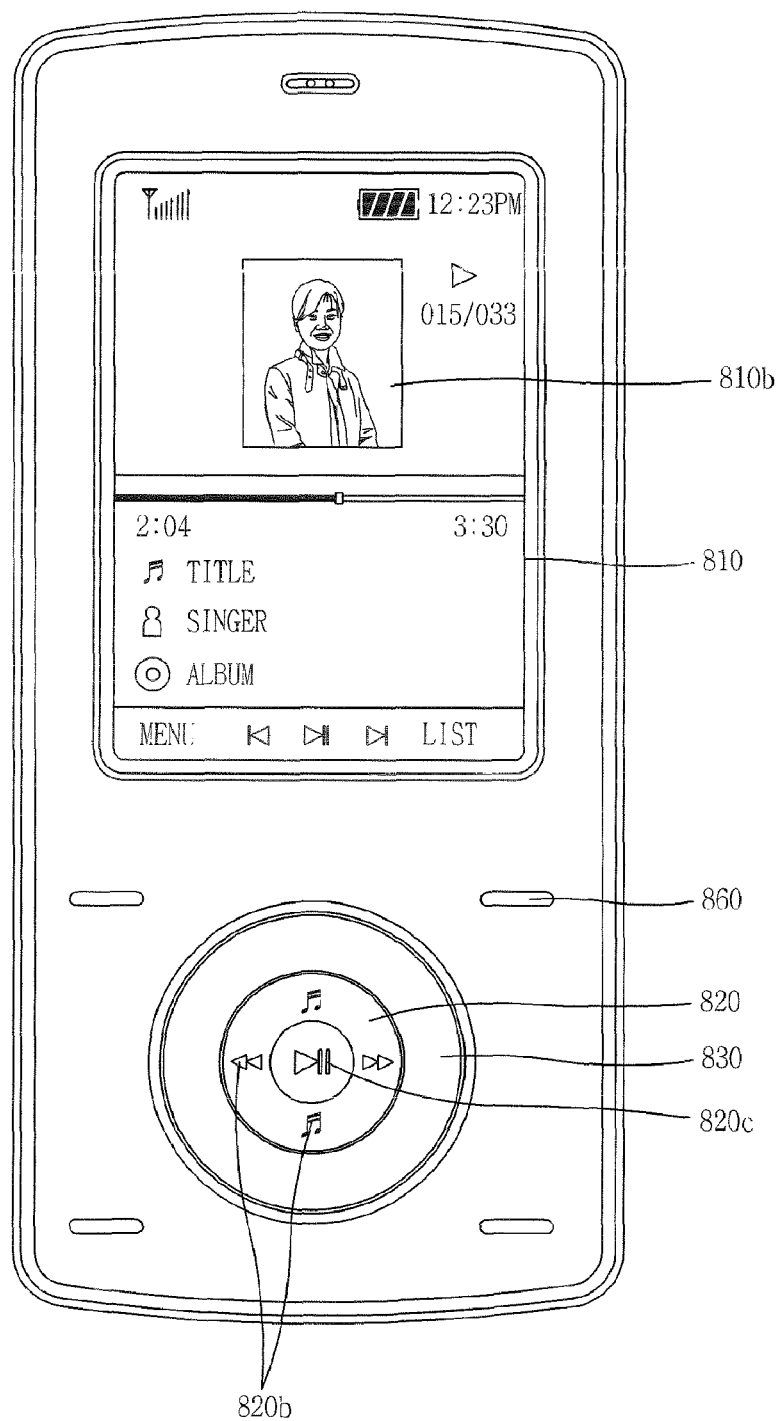
Figure 16C:
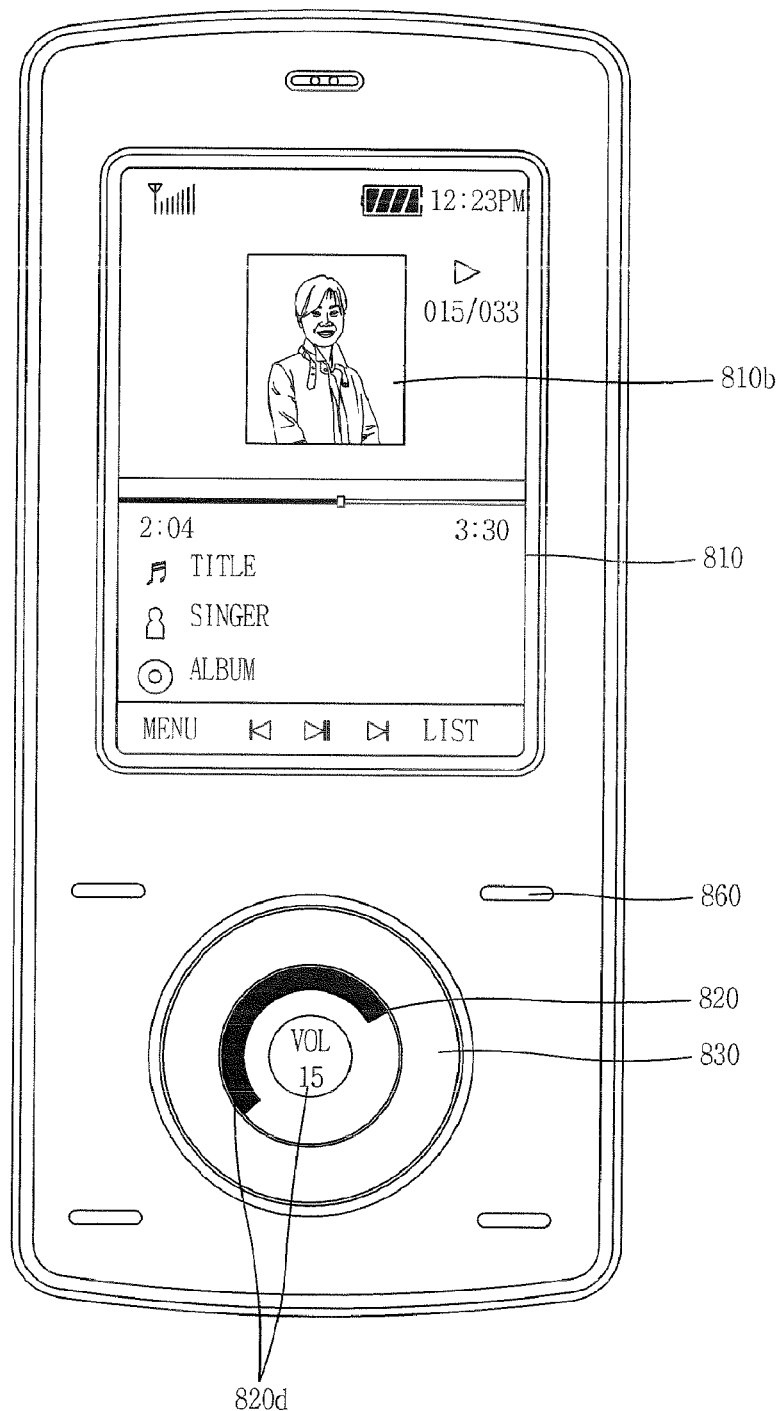

FIGS. 16A to 16C are front views showing operational states of a mobile terminal 800 according to an eighth exemplary embodiment of the present invention. FIGS. 16a to 16c show an example that music is played by using the mobile terminal 800. Second visual information outputted through a second display unit 820 includes a numerical value or a graphic image with respect to a present amount of image (video), sound (audio), broadcast, etc., that can be selected or controlled by manipulating a scroll unit 830.

For example, FIG. 16A shows a case of loading a player for reproducing a music file (MP3, wav file, etc.). A guidance or an explanation 810a is outputted through a first display unit 810, and the second display unit 820 outputs a graphic image 820a indicating that the player is being loaded. FIG. 16B shows when information about selected music is displayed on the first display unit 810. Further, a play or stop button 820c with respect to the music is allocated to the second display unit 820. In this instance, a function mark 820b visually indicating a function that can be operated by the scroll unit 830 together with its position is outputted on the second display unit 820.

Next, FIG. 16C shows when a sound volume is controlled while reproducing a multimedia file. Further, the sound volume indicated by a graphic image 820d is displayed on the second display unit 820. The sound volume may be adjusted by scrolling on the scroll unit 830.

FIGS. 17A to 17E are front views showing operational states of a mobile terminal 700 according to a ninth exemplary embodiment of the present invention. As shown in FIGS. 17A to 17E, first visual information outputted on a first display unit 910 includes information on reproduced contents. Second visual information outputted through a second display unit 920 displays a reproduced state of selected contents or include an item which is disposed to be close to a corresponding position of the scroll unit 930 and can be controlled by the scroll unit 930.

Figure 17A:
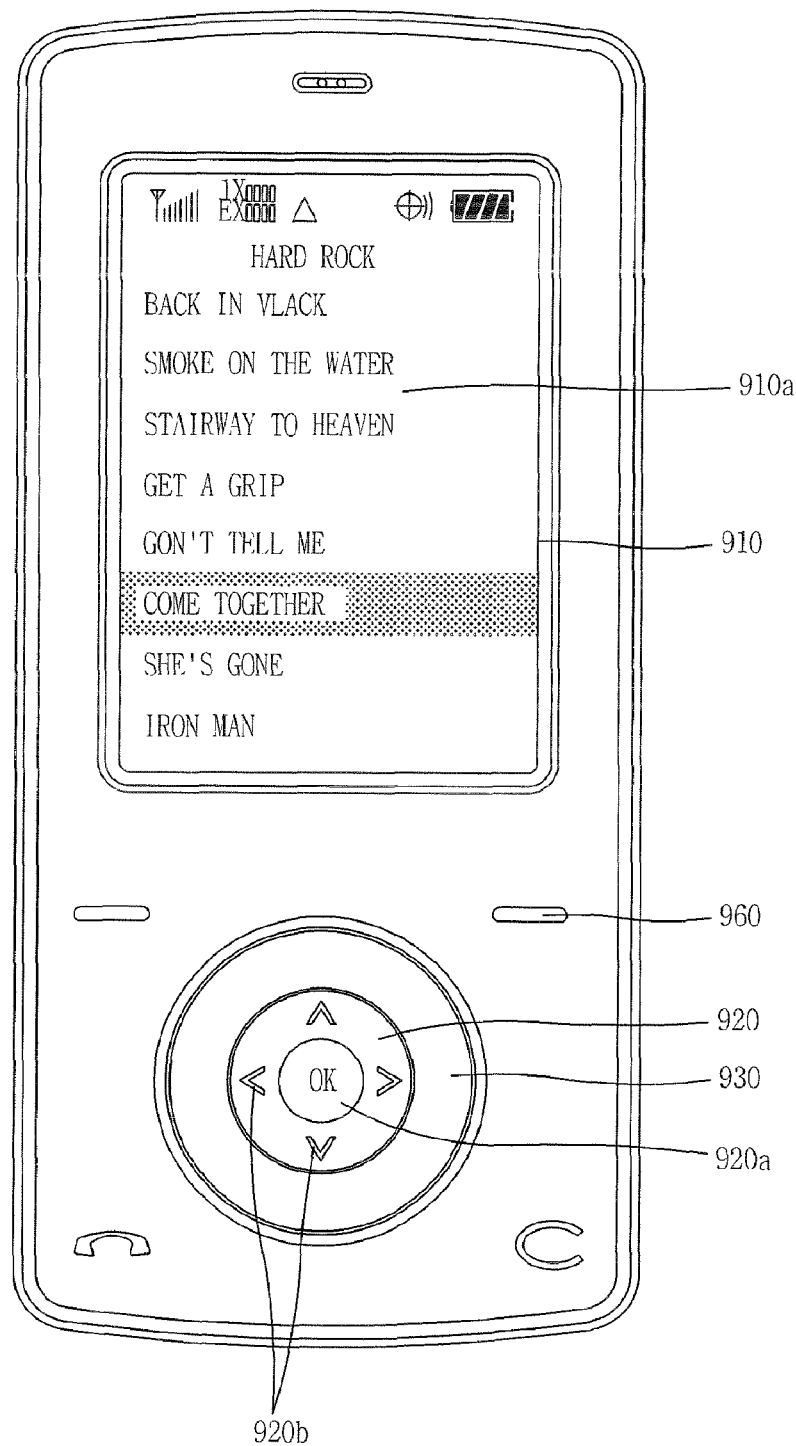
FIGS. 17A to 17E are front views showing operational states of a mobile terminal 900 according to a ninth exemplary embodiment of the present invention.

Namely, as shown in FIG. 17A, when a multimedia file 910a is listed up through the display unit 910, the second display unit 920 outputs marks 920b indicating directions in which a pointer may be moved through the scroll unit 930. The second display unit 920 outputs an "OK" mark 920a in order to receive an input.

Figure 17B:
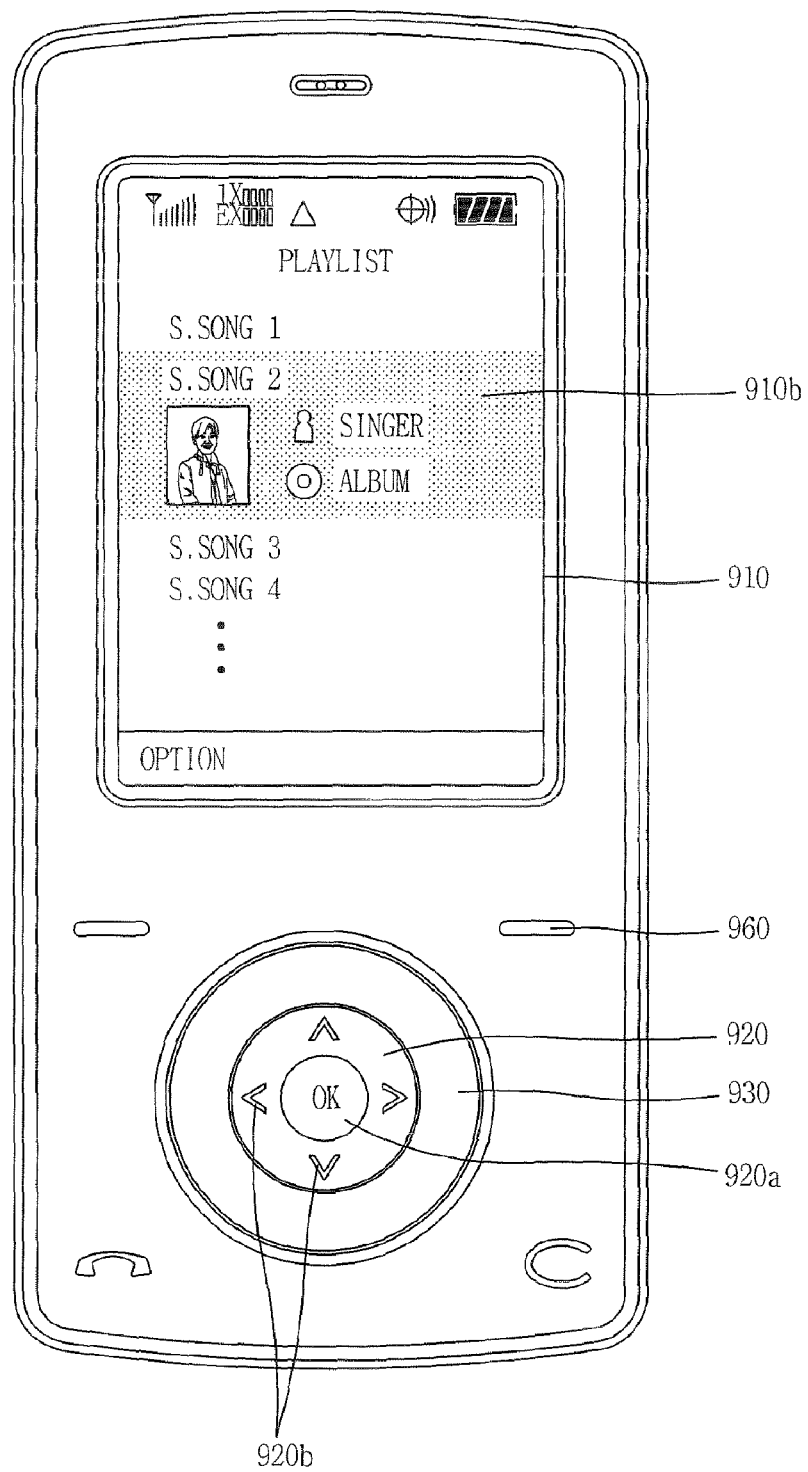

In the state as shown in FIG. 17A, when an OK input is generated at the manipulation unit disposed on a front surface of the second display unit 920, as shown in FIG. 17B, the first display unit 910 outputs detailed information 910b of the selected multimedia file. In addition, the second display unit 920 outputs marks 920b indicating direction in which the pointer can be moved through the scroll unit 930 and play or stop marks 920c with respect to a desired item.

Figure 17C:
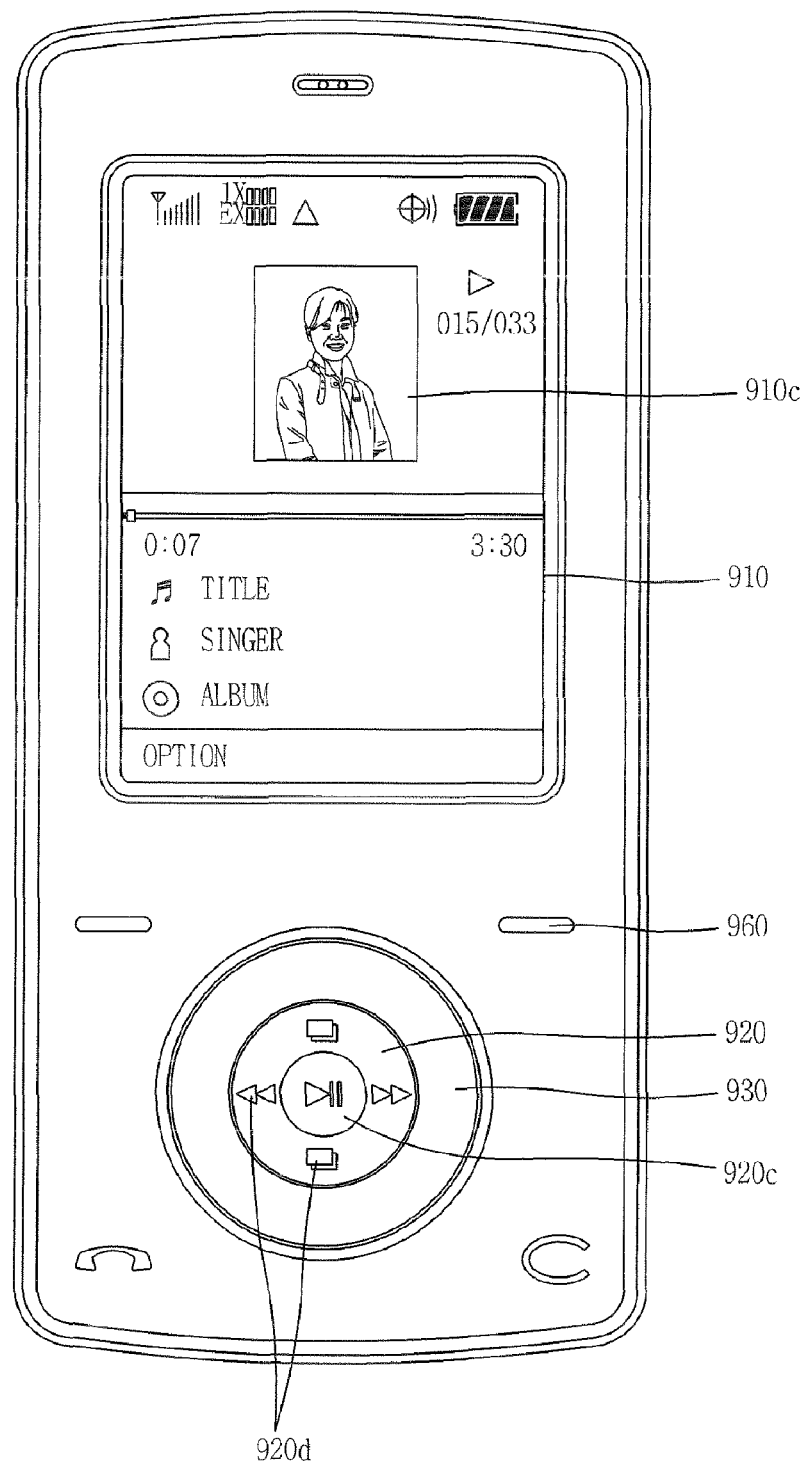
Figure 17D:
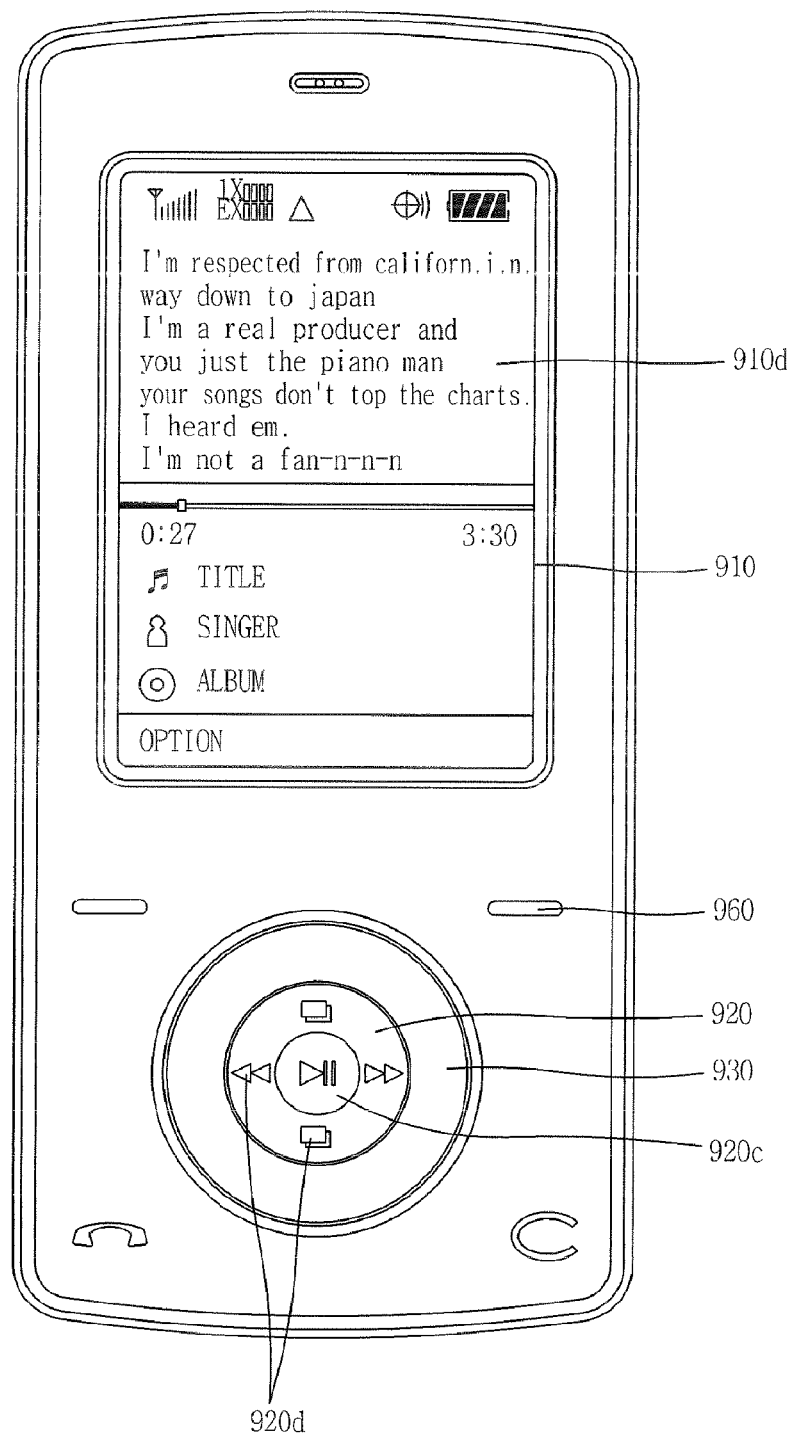
Figure 17E:
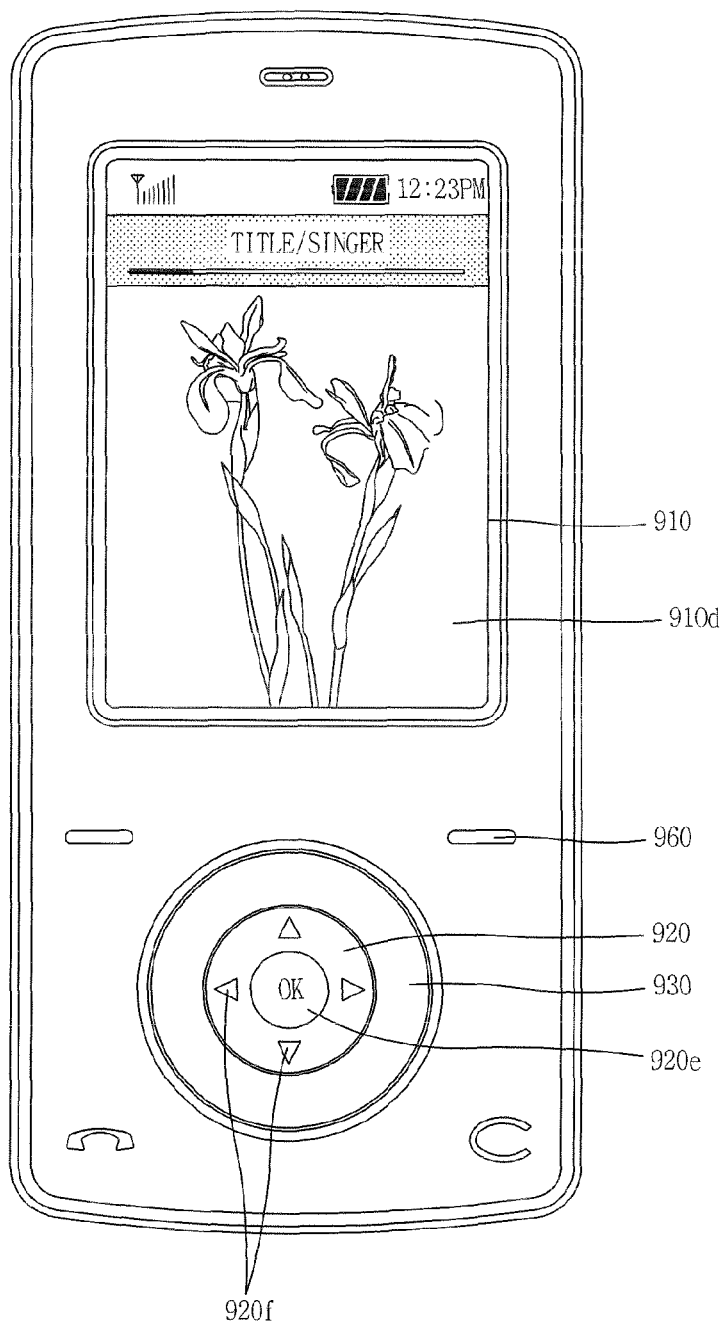

When there is a tactile input with respect to the manipulation unit disposed on the front surface of the second display unit 920, selected music is played and the first display unit 910 outputs detailed information of the selected music in the form of text, photo or video as shown in FIG. 17C. In addition, the second display unit 920 outputs marks 920d indicating corresponding input positions of the scroll unit 930 indicating a movement of a file or a fast play, etc. As shown in FIG. 17D, lyrics 910d of the selected music is outputted to the first display unit 910 through an input of the scroll unit 930 or the manipulation unit.

As described above, the embodiments of the present invention have many advantages. That is, first, because a menu selected by the scroll key is displayed on the manipulation unit that operates the selected menu, the user can easily and conveniently recognize the selected menu and any other menus. Second, because the menu desired to be activated by the user is displayed on the manipulation unit, malfunction such as inputting a menu other than the desired menu can be minimized.

Third, because the second display unit disposed at the center of the scroll unit serves to output useful visual information separately from the first display unit, the usage condition can be improved. Fourth, because the scroll unit that enables fast searching and accessing is combined with the merits of the display unit that can transfer information so as to be quickly recognized, the usability and efficiency in the multimedia environment can be enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An input device of a mobile terminal having a display unit, the input device comprising:

a scroll unit installed on a housing of the mobile terminal and configured to scroll through a list of menu items presented on the display unit, wherein the list of menu items correspond to various functions of the mobile terminal;

a menu display unit configured to display a first menu item of the list of menu items when the first menu item is selected by the scroll unit from the list of menu items presented on the display unit and to replace the first menu item with a second menu item of the list of menu items when the second menu item is subsequently selected by the scroll unit from the list of menu items presented on the display unit, wherein the menu display unit is implemented on the housing separately from the display unit, and wherein the menu display unit is further configured to display one of the list of menu items when said one of the list of menu items is selected by the scroll unit while the display unit is turned off; and a manipulation unit configured to activate the function of the mobile terminal when pressed.

2. The device of claim 1, wherein the manipulation unit comprises a push key configured to operate in a pressing manner, wherein the push key includes:

a switch mounted within the case; and a push protrusion mounted on a rear surface of the menu display unit, and wherein the push protrusion presses the switch when the manipulation unit is pressed.

3. The device of claim 1, wherein the manipulation unit comprises a touch key that inputs information by touching, and wherein the touch key includes a touch pad that inputs signals according to a touch operation on the manipulation unit and is mounted on a front surface of the menu display unit.

4. The device of claim 1, wherein the menu display unit comprises one of an LCD (Liquid Crystal Display) and LEDs (Light Emitting Diodes) installed on a rear surface of the manipulation unit and configured to display the first or second menu item through the rear surface of the manipulation unit.

5. The device of claim 1, wherein the scroll unit comprises a scroll key in a form of a circular ring, and the manipulation unit is disposed at a central portion of the scroll key.

6. A mobile terminal, comprising:
a terminal body;
a display unit mounted on the terminal body; and
an input device mounted on the terminal body and configured to input information, wherein the input device comprises:
  a scroll unit configured to scroll through a list of menu items presented on the display unit, wherein the list of menu items correspond to various functions of the mobile terminal;
  a menu display unit configured to display a first menu item of the list of menu items when the first menu item is selected by the scroll unit from the list of menu items presented on the display unit and to replace the first menu item with a second menu item of the list of menu items when the second menu item is subsequently selected by the scroll unit from the list of menu items presented on the display unit,
  wherein the menu display unit is implemented on the housing separately from the display unit, and wherein the menu display unit is further configured to display one of the list of menu items when said one of the list of menu items is selected by the scroll unit while the display unit is turned off; and
  a manipulation unit configured to activate the function of the mobile terminal when pressed.

7. The terminal of claim 6,
wherein the manipulation unit comprises a push key configured to operate in a pressing manner,
wherein the push key includes:
  a switch mounted within the case; and
  a push protrusion mounted on a rear surface of the menu display unit, and wherein the push protrusion presses the switch when the manipulation unit is pressed.

8. The terminal of claim 6,
wherein the manipulation unit comprises a touch key that inputs information by touching, and
wherein the touch key includes a touch pad that inputs signals according to a touch operation on the manipulation unit and is mounted on a front surface of the menu display unit.

9. The terminal of claim 6, wherein the menu display unit comprises one of an LCD (Liquid Crystal Display) and LEDs (Light Emitting Diodes) that is installed on a rear surface of the manipulation unit and that is configured to display the first or second menu item through the rear surface of the manipulation unit.

10. The terminal of claim 6, wherein the scroll unit comprises a scroll key in a form of a circular ring, and the manipulation unit is disposed at a central portion of the scroll key.

11. The terminal of claim 6, wherein the scroll unit comprises:
  a rotary wheel disposed to be rotatable on a surface of the terminal body and having a through hole at a central portion of the rotary wheel; and
  a rotation sensing unit configured to sense rotation of the rotary wheel.

12. The terminal of claim 11, wherein the rotation sensing unit comprises:
  a magnet fixed at the rotary wheel to rotate together with a rotation of the rotary wheel; and
  a magnetic sensor disposed on a rotation trace of the magnet and configured to sense a magnetic field of the magnet.

13. The terminal of claim 11, wherein the scroll unit comprises:
  first switch units disposed at multiple positions along a circumferential direction of the rotary wheel and configured to operate according to a pressing operation of the rotary wheel.

14. The terminal of claim 13, wherein the first switch units and the magnetic sensor are installed on a printed board installed within the terminal body.

15. The terminal of claim 14, wherein the printed board further comprises a second switch unit that senses an input signal applied to an outer portion of the rotary wheel.

16. The terminal of claim 15, wherein the second switch unit is configured to operate according to a touching method.

17. The terminal of claim 6, wherein the scroll unit comprises:
  a touch wheel disposed on a same plane as a surface of the terminal body and having a through hole formed at a central portion of the touch wheel; and
  a touch scroll sensing unit configured to sense a touch scroll applied to the touch wheel.

18. The terminal of claim 17, wherein the scroll unit further comprises:
  third switch units disposed at multiple positions along a circumferential direction of the touch wheel and configured to operate according to a pressing operation of the touch wheel.

19. The terminal of claim 6, wherein the menu display unit comprises:
  a touch sensing unit disposed on a rear surface of the manipulation unit and configured to sense a touch applied to the manipulation unit; and
  a display module disposed on a rear surface of the touch sensing unit.

20. The terminal of claim 19, wherein the touch sensing unit comprises a conductive film.

21. The terminal of claim 6, wherein the manipulation unit comprises:
  a translucent button that is installed to be pressable at a center of the scroll unit; and
  a fourth switch unit provided at one side of the translucent button and configured to operate according to a pressing operation of the translucent button.

22. The terminal of claim 21, wherein one end of the button is rotatably supported by a hinge and another end of the button is installed to press the fourth switch unit.

23. The terminal of claim 6, wherein the menu display unit is configured to display an icon for identifying a mode outputted from the display unit.

24. The terminal of claim 6, wherein the menu display unit is configured to display a numerical value or a graphic image with respect to a present amount of image, sound or broadcast that can be selected or controlled by manipulating the scroll unit.

25. The terminal of claim 6, wherein the display unit is configured to provide a selectable list, and the menu display unit is configured to display a direction mark disposed to be adjacent to a corresponding position of the scroll unit to be manipulated, the direction mark indicating a movement direction of a pointer with respect to the selectable list.

26. The terminal of claim 6, wherein the display unit is configured to provide information on reproduced contents, and the display unit is configured to provide a reproduction state of the contents or an item which is disposed to be adjacent to a corresponding position of the scroll unit and can be controlled by the scroll unit.

* * * * *